United States Patent
Catchmark et al.

(10) Patent No.: US 6,921,215 B2
(45) Date of Patent: Jul. 26, 2005

(54) OPTICAL AND OPTOELECTRONIC PACKAGING AND INTEGRATION PLATFORM WITH STATIONARY AND MOVABLE ELEMENTS

(76) Inventors: Jeffrey M. Catchmark, 493 Blanchard St., Bellefonte, PA (US) 16823; Guy P. Lavallee, 1395 University Dr., State College, PA (US) 16801

( * ) Notice: Subject to any disclaimer, the term of this patent is extended or adjusted under 35 U.S.C. 154(b) by 0 days.

(21) Appl. No.: 10/756,706

(22) Filed: Jan. 12, 2004

(65) Prior Publication Data

US 2005/0084219 A1 Apr. 21, 2005

Related U.S. Application Data

(62) Division of application No. 09/968,596, filed on Oct. 1, 2001, now Pat. No. 6,704,488.

(51) Int. Cl.$^7$ .............................. G02B 6/36; G02B 6/00
(52) U.S. Cl. ........................................ 385/92; 385/137
(58) Field of Search .......................... 385/92, 137, 130, 385/131, 132

(56) References Cited

U.S. PATENT DOCUMENTS

| | | | | |
|---|---|---|---|---|
| 5,371,820 A | * | 12/1994 | Welbourn et al. | 385/76 |
| 5,611,008 A | * | 3/1997 | Yap | 385/14 |
| 6,154,591 A | * | 11/2000 | Kershaw | 385/39 |
| 6,549,713 B1 | * | 4/2003 | Pi et al. | 385/137 |
| 6,606,442 B2 | * | 8/2003 | Korenaga et al. | 385/129 |
| 6,704,488 B2 | * | 3/2004 | Lavallee et al. | 385/137 |

* cited by examiner

*Primary Examiner*—Chandrika Prasad

(57) ABSTRACT

The integration, packaging and assembly of optical components, optoelectronic components and submounts using features pressed into ceramic elements. The submounts may be composed of a ceramic material and contain optical and optoelectronic components. The submounts can be movable to change the optical characteristics of modules created through the integration of optical or optoelectronic components. Such modules can have functions including optical detection, optical signal generation, optical signal branching or processing, optical switching, optical multiplexing or de-multiplexing, optical modulation or optical transmission. The disclosure also provides an example, which is not meant to be limiting, of an optical module including two or more optical components and a packaging, integration and assembly platform.

21 Claims, 17 Drawing Sheets

OPTICAL AND OPTOELECTRONIC PACKAGING AND INTEGRATION PLATFORM WITH STATIONARY AND MOVABLE ELEMENTS

This is a division of application Ser. No. 09/968,596 filed Oct. 01, 2001, now U.S. Pat. No. 6,704,488.

FIELD OF THE INVENTION

The present invention relates to optical fibers, and in particular to a packaging and assembly platform capable of accurately and easily connecting one or more optical fibers to one or more optical components having functions, such as optical detection, optical signal branching, optical multiplexing, optical switching, optical modulation and/or optical transmission. The present invention also describes optical modules comprising one or more optical components and such one or more packaging and assembly platforms.

DESCRIPTION OF THE PRIOR ART

As disclosed in U.S. Pat. No. 6,222,967, "Packaging Platform, optical modules using the platform, and methods for producing the platform and the module," an optical component using a planar optical waveguide circuit, connection between an optical waveguide and an optical fiber requires alignment precision of the order of microns. Simplifying this connection is very important in reducing the manufacturing cost. An optical component which processes fast signals also involves fine electrical wiring, and thus requires a fan-out structure for electrical connection. An optical device generally needs sealing to achieve reliability. In an optical module having structures for a fiber pigtail and electrical wiring, it is necessary to seal large capacity regions above these structures. This has caused problems relating to packaging capacity and sealing effect.

Moreover, optical modules may have to implement many different types of components which can include lenses, individual gratings, thin film filters, isolators and/or other components which would need to be aligned and secured.

It is disclosed in the aforementioned patent that an improvement in the prior art of packaging and assembling optical components can be made by forming a packaging platform containing patterns which could be used to align optical waveguide components. It is further disclosed that this packaging platform could be made by injection molding or transfer molding. One class of materials discussed which could be used to create the packaging platform is synthetic resins. One specific class of synthetic resin discussed consisted of a thermosetting resin which contained inorganic fillers such as Talc, Mica, Calcium Carbonate, clay, alumina, alumina silicate, silica, zinc oxide, carbon, aluminum hydroxide, asbestos fiber, glass fiber and carbon fiber.

The aforementioned patent also mentions the use of ceramic as a packaging platform material, but no specific ceramic material is disclosed and no process for producing a module using ceramic was disclosed. Ceramic materials such as Alumina are mentioned, but only as an inorganic filler to a synthetic resin. In fact, the term ceramic is an extremely broad term used to include structural clay products, whitewares (dishes), refractories, glasses, abrasives and even cements. Most of these materials are not suitable for mounting and/or packaging optical, optoelectronic and/or electronic components. One type of ceramic material is fabricated using one or more powders, which are wet or dry pressed into a desired shape using either a hot or cold die. These materials are not discussed in the aforementioned patent.

Moreover, in embodiment 17 in the aforementioned patent, where the use of ceramic as a packaging platform is disclosed, the problem of shrinkage of the ceramic during firing or sintering is mentioned, which caused a deformation in the substrate. This deformation prevented the precise alignment of optical fibers or waveguides or other optical components. In order to resolve this, features were made by precision dicing into the ceramic substrate after firing or sintering, which were used for alignment in the transverse direction.

Thus features formed by injection or transfer molding of ceramic materials for the use of aligning optical fibers or waveguides or optical components were not disclosed in the aforementioned patent.

In addition, many aspects of sintered ceramic substrate formation were not discussed in the patent which would further inhibit the accurate formation of features in ceramic substrates after sintering. One such aspect includes so called 'grain growth' during sintering. In the case of Alumina ceramic substrates, this grain growth is essentially the assembly of $Al_2O_3$ crystal-like structures which can extend outward from the surface of the molded pre-fired material. These grains can be greater than 1 micron in size and even greater than 10 microns in size. This deformation of the substrate would be in addition to the substrate shrinkage after sintering, making the tolerance of +−0.1 micron or +−1.0 micron difficult to achieve.

In addition, in the practice and implementation of such a packaging platform, the meaning of the dimensional tolerance of, for example, +−1.0 micron is not made clear in the aforementioned patent. This tolerance is presumed to be an overall tolerance of the platform, not a specific tolerance quantifying the dimensional accuracy of features on said platform which may be 10–100 microns apart. This is an important point since different deformation mechanisms will play different roles in the accuracy of the alignment of two optical components depending upon the size and distance between the components. For example, grain growth after sintering may impact the achievable alignment tolerance between two optical components located approximately 2 to 10 microns apart or 10 to 100 microns apart much more than shrinkage (or bow) after sintering.

Another factor not discussed in the aforementioned patent is the impact of binders which are typically (but not always) added to ceramic powders used to make ceramic substrates. These binders are used to keep the transfer molded pre-fired ceramic substrate or part's shape until the substrate or part has been fired or sintered. During the firing process, the binder is 'burned off' or thermally removed from the substrate or part and the formation of grain boundaries during firing play a key role in the structural stability of the substrate or part after firing.

Another factor not discussed in the aforementioned patent is the stability of the packaging platform to variations in ambient temperature. Many synthetic resins exhibit deformations in their physical geometry due to expansion and contraction of the material as the ambient temperature is changed. In the case of optical waveguide to waveguide coupling, this thermal deformation is critical to the stability of optical coupling. In fiber optic modules such as uncooled laser diodes, the change in optical coupling as a function of ambient temperature due to the change in the physical geometry of the package is typically referred to as the tracking error and can be greater than +−1.0 dB. Thus it is desirable to form a packaging platform of a thermally stable material.

Yet another factor not discussed in the aforementioned patent is the cost effectiveness of using molded ceramics.

Several approaches have been explored to reduce the cost of packaging and assembling optical and optoelectronic modules. The work contained in U.S. Pat. No. 6,222,967 is an example of one approach. In addition to just packaging and assembly of optical and optoelectronic modules and components, much work has focused on the further integration of electronic devices with optical and optoelectronic devices to further reduce the cost of more complex optical, optoelectronic and electronic assemblies. One approach for doing this includes the use of a Silicon substrate (a so called 'Silicon optical bench') which contains features for aligning optical and optoelectronic components. The cost, complexity and limitations of both these approaches have limited the wide spread implementation of this technology.

What is required is a packaging and assembly approach which addresses the issues of optical and optoelectronic component alignment, the integration of electronic devices and the need for a simple assembly process containing not only fewer and simpler steps, but implementing fewer and less complex individual pieces.

SUMMARY OF THE INVENTION

According to this invention, substrates formed from wet or dry, hot or cold pressed ceramic powders, which powders are fired forming a finished stable substrate or platform, are used as a packaging platform and/or platform to align, position, secure and/or integrate optical, optoelectronic and/or electronic devices or components. Some optical components which can be aligned include fiber optic and integrated optic waveguides, lenses, gratings, optical filters, collimators including integrated fiber optic waveguides and lenses, metallized optical components, beam splitters, isolators, quarter- and half-wave plates, faraday rotators, polarization controlling elements, flat and curved mirrors, spatial filters, pelicals, photonic crystals, Minature Electro-Mechanical Systems (MEMS) as known in the related art, and related or similar bulk or integrated components. Some optoelectronic elements include laser diodes, photodiodes, metal-semiconductor-metal photo responsive elements, modulators, and other related components. Electrical components include any integrated circuits, transistors, resistors, capacitors, inductors, diodes, in any material, and any other related components.

A platform of the invention provides features for positioning these elements in the x, y and z directions. This platform can simplify the coupling of light from an optical or optoelectronic component to another optical or optoelectronic component or simplify the electrical coupling from an electronic or optoelectronic component to another electronic or optoelectronic component. This platform can also serve as the final packaging structure, which can be sealed or unsealed, for the integrated, aligned and/or secured optical, optoelectronic and electronic components, where said structure includes any required or desired optical, electrical and/or mechanical features. Mechanical features include, for example, holes for mounting a finished module or for guiding the attachment of, for example, a lid composed of the same or similar material.

It is another aspect of this invention to show that the use of lenses and/or collimators facilitate the use of ceramic substrates, or substrates of any material, including those mentioned in the aforementioned patent, as a packaging platform by expanding the optical beam size so that the impact of substrate deformation of any kind on the coupling of light from one component to another component can be reduced.

It is another aspect of this invention to show that the impact of grain growth can be reduced by using powders used to make ceramic substrates which contain particle sizes less than about 100 nm or less than about 500 nm. The reduction in size of the particles composing the powders used to make ceramics, including, for example, Alumina, reduces the grain growth under typical sintering conditions to <1 micron.

It is another aspect of this invention to improve the alignment accuracy of components located in close proximity by using molded sintered ceramic materials made from powders which contain particle sized less than about 100 nm or less than about 500 nm.

It is another aspect of this invention to show that further improvements in the assembly process can be achieved by implementing sub mounts or secondary substrates, which are positioned and attached to the primary substrate for the purpose of aligning all types of optical and/or optoelectronic components where, for example, the optical and/or optoelectronic component needs to be positioned perpendicular to the surface of the primary substrate.

It is another aspect of this invention to improve the performance of optoelectronic and/or electronic components mounted on the described substrates by producing features which serve to isolate electrically one part of a circuit placed on the substrate from another part of a circuit placed on the substrate, or to isolate the circuit from the environment outside the packaged module or vice-versa.

It is another aspect of this invention to describe the design and assembly of fiber optic components, including new components.

BRIEF DESCRIPTION OF THE DRAWINGS

Other aspects, advantages and novel features of the invention will become more apparent from the following detailed description of the invention when considered in conjunction with the accompanying drawings wherein.

DETAILED DESCRIPTION OF THE INVENTION

Figure 1:
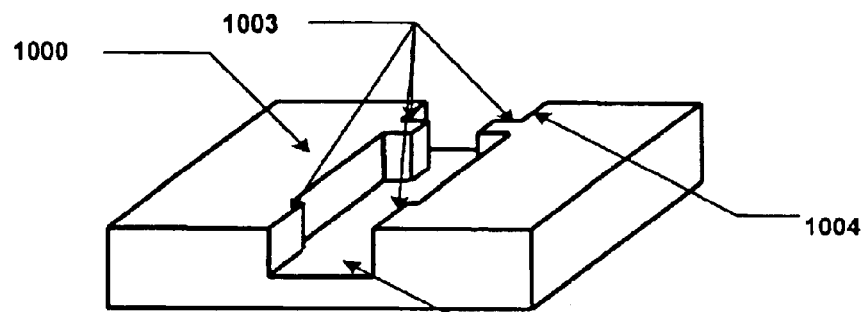
FIG. 1: A schematic drawing of a perspective view of a substrate for mounting an optical component such as a lens or collimator.

One important step toward meeting these goals was identifying a material or group of materials which could serve multiple functions in a final assembly. The inventors have determined that a preferred material would exhibit, for example, excellent physical characteristics making it suitable to be implemented as a packaging material, but also exhibit good electrical characteristics, such as a low dielectric constant and high resistivity, making it useful for fabricating electrical interconnects and mounting electronic devices and circuits. Compatibility with existing manufacturing process is also desirable when high volume and low cost production is important These manufacturing processes range from making the material all the way to assembling an optoelectronic module.

A material satisfying these requirements is dry or wet, hot or cold pressed ceramics. In particular, cold (room temperature) dry pressed ceramics are particularly suitable from a cost and performance standpoint. These ceramics include, Alumina, Aluminum Nitride, Beryllium Oxide and possibly Steatite, as well as any other similar or related material. These materials are often formed by dry pressing powders, which contain a small amount of a material known as a binder, into some shape using a mold or rollers, where the mold or rollers which are often cold (room temperature). A typical press pressure for forming a part using a mold is between about 5,000 pounds per square inch to about 10,000 pounds per square inch. After pressing, however, the material is not structurally stable. The pieces are then fired or sintered in an oven which causes the binder to be driven from the piece, and causes the powders to join or fuse forming a mechanically stable material. A typical firing sequence is a ramp from room temperature to about 1000° F. over a period of roughly 8 hours to burn out any binders and/or organics in the pressed part. Then the temperature is increased to about 2400° F. over a period of approximately 6 hours then held at about 2400° F. to allow the ceramic material to fuse. The temperature is then decreased to room temperature from 2400° F. over a period of about 6 hours to avoid cracking. The shape of the piece is maintained, but several deformations occur. One deformation is shrinkage of the part due in part to the binder being driven from the material. Another is bow or a uneven shrinkage due to variations in the density of pressed powder during the pressing process. Such variations can arise from nonuniform distribution of powder in the mold, or due to the physical geometry of the piece. Yet another deformation arises from so called 'grain growth', where the edges of features contained in the pressed piece roughen. This grain growth occurs as the powdered material joins or fuses during firing.

Historically, such ceramics have been used in many diverse applications. In the microelectronics industry, Alumina, for example, has been rolled into sheets, fired and cut into smaller substrates. High frequency electronic circuits have been fabricated on these substrates using processes similar to those found in the printed circuit board (PCB) fabrication industry. Metal interconnect lines and bonding pads are formed on the ceramic substrate, in addition to other passive electrical components, and electronic devices and components are mounted directly on the substrate to form a completed circuit, which is then packaged in another assembly. This is possible due to the desirable electrical and thermal properties of this material, which include a low dielectric constant and a relatively high thermal conductivity.

For other applications, materials such as Steatite have been pressed into very complex and mechanically stable shapes by fabricating intricate molds. Applications include parts for ceramic heaters, spacers for high voltage electrical lines and even grates for outdoor grills.

To date, no one to the inventors' knowledge have combined these two technological areas to press features into substrates typically used for electronic applications to integrate optical and optoelectronic devices. For example, the inventors have not found any prior art relating to the mounting of a laser diode on such a substrate, and then aligning an optical fiber to the output of the laser diode using some type of feature fabricated in the ceramic substrate.

Moreover, no one to the inventors' knowledge has ever tried to use the combination of these technologies to form a substrate which is mechanically stable enough, and which contains mounting features such as screw holes, etc., so that an electrical substrate could be used as a final packaging material, in conjunction with, if desired, a cover or lid fabricated using the same or similar material.

The combination of these two technologies forms a powerful, cost effective solution to the optical, optoelectronic and electronic integration, packaging and assembly problem by reducing the complexity and number of components and processes used to manufacture optoelectronic modules. This is accomplished by using the combination of these technologies to produce a substrate (or substrates) which contain features for positioning (in the x, y and z direction), aligning, integrating and securing optical, optoelectronic and electronic components and where these substrates become the final package. Such optical components can include fiber optic and integrated optic waveguides, lenses, gratings, optical filters, collimators including integrated fiber optic waveguides and lenses, metallized optical components, beam splitters, isolators, quarter- and half-wave plates, faraday rotators, polarization controlling elements, flat and curved mirrors, spatial filters, pelicals, photonic crystals, Minature Electro-Mechanical Systems (MEMS) as known in the related art, and related or similar bulk or integrated components. Some optoelectronic elements include laser diodes, photodiodes, metal-semiconductor-metal photo responsive elements, modulators, and other related components. Electrical components include any integrated circuits, transistors, resistors, capacitors, inductors, diodes, in any material, and any other related components.

One obstacle encountered in realizing this approach for manufacturing optoelectronic modules was the deformation of the substrate described above during firing. Even if a perfect mold were produced, which could form a perfect part, deformation of the part during firing would introduce variations in the sizes and positions of features used for aligning optical and optoelectronic components such as fiber optic waveguides, lenses, laser diodes, photo diodes, gratings, etc. Mold manufacturing technologies such as precision milling or wire and ram electro discharge machining can be used to produce molds with feature accuracies down to +−0.1 micron. This type of accuracy is more than sufficient for fabricating features for aligning optical and optoelectronic components. Deformation during firing can change that tolerance to +−75 microns across a given part, however.

At this point it is important to understand specifically how a given part can deform and what implications such deformation can have on the design of substrates used for mounting and aligning optical and optoelectronic components. Substrate bow arising from nonuniform powder density in a pressed part can change the tolerance on the position of features by +−75 microns across the substrate. However, variations in the positional and/or dimensional tolerance of features located, for example, <100 microns from each other may in fact be much more accurately placed. In this case, substrate bow may only introduce a +−1 micron or so deformation, which is still acceptable for aligning optical components. Features 10–20 millimeters apart, however, may be displaced by +−75 microns. Substrate bow can be reduced, however, by making the substrate thicker and/or making the depth of features small in comparison to the overall substrate thickness. Another approach for reducing the substrate bow includes weighing down the part during firing, or placing the part down on a extremely flat surface during firing. If a large portion of the surface area of the part is flat, in particular, the edge areas, and these areas represent the highest level of the part, then the bow can be reduced by applying a uniform weight to the part, where the weight will not be disturbed by the firing process. The material used to apply the weight should be flat to the desired precision, which may be on the order of +−1–5 microns across the surface of the object applying the weight. One example of a process for applying a weight would be uniformly weighing a silicon wafer with some other material where the Silicon wafer would be placed on top of the part during firing. Silicon wafers with very flat surfaces are readily available and could be weighted with a variety of other materials. In particular, however, bow can be reduced by placing the part on a extremely flat material such as a Silicon wafer.

Grain growth is a different phenomena which essentially roughens the edges and surface of the substrate and features pressed into the substrate. The amount of grain growth which occurs during firing depends upon many parameters, including the size of the particles composing the powder used for pressing the part and the times and temperatures used for firing the parts. If a part is fired longer, for example, typically more grain growth occurs. More grain growth, however, typically translates to a part with better mechanical stability (strength). For typical materials found in the industry, grain growth can be easily in the 10–25 micron range. However, recently, finer powders are now available, and by fine tuning the process, grain growth in the 1–2 micron range can be obtained. However, there have been no applications to the knowledge of the inventors for companies who are pressing ceramic parts which require such small grain growth and such information has been obtained by performing studies on different powders now available.

The present invention can make use of this reduced amount of grain growth to actually fabricate features on ceramic substrates to align optical and optoelectronic components which are closely spaced, reducing any impact of substrate bow.

In an attempt to further reduce grain growth for the present invention, other powders were explored, including powders which contain particle sizes of <100 nanometers. These powders are available, for example, from Nanophase Technologies. Sample parts were cold, dry pressed by DuCo Ceramics for the inventors and fired using typical firing parameters as described above. Grain growth of ~1 micron and less was observed with a non optimized process.

Thus, by using precision mold manufacturing techniques and by implementing powders and processes to reduce grain growth, electrical quality substrates with complex features can be fabricated allowing the alignment of optical and optoelectronic devices.

In some applications, however, complex optical circuits may be required which would involve coupling the output of a waveguide of a laser diode, for example, to some other optical or optoelectronic component. Another example is the output of an optical fiber which would need to be coupled to an optical grating and then coupled back into several optical fibers. These components may be positioned far enough from each other such that substrate bow becomes a problem. In this case, a lens, lens system or collimator can be used to prevent the degradation in performance (such as insertion loss) of the module due to such substrate deformation. Such improvements can be realized since lenses or collimators can be used to expand tiny optical beams which are difficult to align to and couple into optical components to large beams which can be propagated across large distances and then refocused into optical or optoelectronic components. For example, the insertion loss of the coupling of one single mode fiber to another single mode fiber (appropriately cleaved and coated) is extremely sensitive to displacement in any direction, even separation. Small transverse displacements of as little as 5 microns can substantially increase the insertion loss. However, if a collimator in a infinite conjugate arrangement (i.e., output of the collimator focused to infinity) is mounted to the end of each of the optical fibers, expanding the beam to, for example, 600 microns, then a displacement of as much as 75 microns can only degrade the insertion loss by <1 dB.

Thus, by incorporating lenses and/or collimators in optical circuits, the impact of substrate bow can be substantially reduced. Moreover, the optical axis of lenses can be accurately aligned to integrated waveguides, such as those in modulators or laser diodes, since the lens would be positioned close to the waveguide, reducing any impact of substrate bow. By using an accurate mold and by limiting grain growth to ~1 micron, good coupling efficiency can be achieved.

The implementation of a collimator as described above has additional advantages, which include providing mechanical stability to the fiber optic waveguide throughout the entire assembly process as well as for final use in the field as a part of a completed product. By designing fiber optic components where collimators are used to couple light into and out of an optical module, a simpler more robust manufacturing process can be implemented where no or little fiber optic cable splicing or waveguide positioning is required.

Another advantage of this invention is the vast array of features possible to align nearly any optical, optoelectronic and electronic component. In particular, features can be engineered to ensure that optical beams propagating across the substrate are not impaired or blocked in any way. This will become apparent in the preferred embodiments.

Many different features can be pressed into ceramic using the process described above. The types of features possible include features on two or more levels which can be cylindrical, V-shaped, rectangular, or have any desired or needed shape to aid in the positioning, aligning and/or securing of optical, optoelectronic and electronic components.

One feature is a simple rectangular or box-like feature which could hold a collimator and the attached fiber cable, or which could hold a lens. This will become apparent in the preferred embodiments. More complicated features are possible, though. As an example, one type of feature which can be used to aid in the assembly process is a set of triangular features which enable, for example, a laser diode chip to be aligned to another optical, optoelectronic, electronic and/or thermal. In this case, two opposing triangular features (tips pointing toward each other) are fabricated projecting from the surface of the laser diode which are to be inserted into similar two triangular features embedded into said substrate where the triangular features embedded into said substrate are larger but where the tips are fabricated to essentially the same dimension or slightly larger. During assembly, the laser diode chip is placed onto said substrate where one of the triangular features on the chip is placed into the corresponding larger triangular feature in the substrate but in a more central position, enabling a reduction in the precision of the placement process, which may be manual, automated or even a pick and place process as known to one skilled in the art. Final alignment is achieved by tilting the substrate such that the Up of the triangular feature is lower than the rest of the feature and, if required, subjecting the substrate to an ultrasonic vibration, which has the effect of sliding the point of the triangular feature on the chip to align with the point of the triangular feature of the substrate. Once this occurs, the other triangular feature on the chip will align with the other triangular feature on the substrate and the die will slide into position flat on the substrate. Such a process can be applied to any optical, optoelectronic or electronic component on which such features can be made.

Verification that the chip is in position can be accomplished by shining a bright light onto the chip on an angle and by placing a camera or photoconductive element in the position of the reflection of the light. Since the surface of most chips are at least partially flat and reflective, the light will be reflected at the desired angle only when the chip is correctly positioned flat on the substrate.

Yet another important feature is an indentation or groove extending slightly underneath the facet of a laser diode waveguide or some other optical waveguide mounted in a flip-chip configuration. Such a groove will prevent the substrate from clipping or blocking the optical output from the laser diode facet or waveguide end. This will become more apparent by examining the preferred embodiments.

Other features can be implemented which extend under components to facilitate the coupling of optical beams from one component to another component, where the area of the component which is to emit, or be exposed to, an optical beam is perpendicular to the surface of the substrate or is facing down into the substrate. An example of this is the coupling of an optical beam from a lens or collimator to a photo diode which is mounted such that the active region of the device is positioned facing the surface of the substrate. In this case, a groove like feature allowing a clear optical path for an optical beam can be produced in the substrate, in accordance with the teachings of the present invention, where the groove extends underneath the photodiode. The groove-like feature, which is located underneath the photodiode, can be produced so that the end of the feature exhibits a flat angled surface, where the angle can be 45 degrees. The flat surface feature located at the end of the groove can have additional featurtes for holding an optical component such as a mirror. The mirror can reflect an optical beam propagating in the groove parallel to the surface of the wafer, to change its direction 90 degrees allowing the beam to couple, for example, the active region of a photodiode, which can be positioned face down on the substrate and aligned to the region of the mirror which reflects the optical beam. This configuration allows an optical beam to be coupled to, for example, a flop chip mounted photodiode. The additional features used to hold an optical component such as a mirror on an angle can be as simple as just extending the flat surface slightly beyond the groove width providing an edge so that a component, such as a mirror, which can be a flat rectangular metalized section of a Silicon wafer, can be held in position aginst the angles surface without sliding into the groove. The edge also serves to hold the mirror in place during attachment. Attachment can be done via a reflow solder process where the angled surface is metalized and the back of the mirror is metalized and coated with solder paste.

Another issue is the securing of optical, optoelectronic and electronic components to pressed substrates containing features as described above. In this case, manufacturing processes currently used to fabricate electronic circuits can be employed. Unpatterned ceramic substrates can be metalized to form metal interconnects and bonding pads as well as thin film components such as resistors. The processes can be applied to substrates with pressed features as well. Entire electrical circuits can now be fabricated and integrated along side optical and/or optoelectronic components on the same substrate. The actual securing of optical and/or optoelectronic components can be done in several ways including reflow solder attachment or epoxy attachment. In the case of reflow solder attachment, the feature would have to be metalized using processes known to companies metalizing ceramic substrates. Some of these companies, however, may be using what is known as a dry film resist process for patterning the metal interconnect metal lines. This dry resist is placed on the substrate like a laminate Alternatively, a liquid resist deposition may be employed, including either a spin-on resist deposition or a spray deposition process as known to someone skilled in the art.

Another process well known to most companies producing metalized ceramic parts involves fabricating what are known as through hole vias, which are essentially metal interconnect lines which pass through the substrate to connect to metal interconnect lines which may be present on the bottom side of the ceramic substrate. These vias are typically fabricated using lasers which drill through the ceramic substrate.

By using special molds containing small diameter rods, such vias can be fabricated in pressed ceramic substrates. These vias can be metalized as with typical ceramic substrates allowing interconnects to extend from the top surface of a pressed substrate to the bottom side. This is important since the pressed substrate is intended to be the final package. Such interconnects can be used to bring electrical signals from the inside of a final assembly to the outside of the assembly. The assembly could then be used as what is known in the industry as a surface mount component and attached to a printed circuit board or other electronic fixture using reflow solder or epoxy attachment processes. By using this interconnect scheme, and by flip chip attaching other optoelectronic components, a module completely free of wire bonds can be developed. By eliminating the wire bonding process from component attachment, a simpler, more robust manufacturing process can be obtained with higher throughput and fewer steps.

Moreover, these vias can be used for thermal management, providing a thermal interconnect between a device attached to the top of the via to a heat sink of some kind attached to the bottom of the via. Since the metal implemented can be copper, this approach for implementing thermal management can be quite effective and improve the reliability of optoelectronic and electronic components and modules.

In addition, such contacts can be used to connect smaller secondary substrates, which can also be of the same ceramic material, to the primary pressed substrate. These two substrates can be aligned using features as described above. A secondary substrate can be used to simplify the assembly of optical and optoelectronic modules. For example, in a typical laser diode module, a photo diode is used to monitor the back side output of the laser diode, providing a measure of optical output level of the device. Typically, this photo diode is mounted so that the surface of the device is perpendicular to surface of the substrate. By mounting the photodiode to another sub mount, the sub mount can be inserted into a feature in the primary substrate with the purpose of positioning the photodiode where the surface of the photodiode is now aligned to the output of the laser diode. In addition, the photodiode can be electrically connected to the rest of the circuit using metal interconnects and vias as discussed above, without implementing any wire bonding processes. Attachment can be done via a reflow solder process or via epoxy attachment. This will become more apparent by examining the preferred embodiments.

Another important sub mount is a lid or cover, completing the assembly of a given module. The lid can be aligned using features as described above and can be attached by reflow solder or epoxy attachment techniques. Features in the substrate and lid can be provided to allow fiber optic cables to extend from the inside of the module to the outside of the module, and the opening can be sealed using epoxy. This final assembly can be done in an inert such as nitrogen rich atmosphere, or any desired environment to hermetically seal the module.

Sub mounts holding components can serve as building blocks for simplyfing the assembly of a optical or optoelectronic module.

Another important aspect of the design of electrical circuits is electrical isolation. High frequency circuits can generate electromagnetic radiation which can interfere with circuits fabricated on the same substrate or with circuits and/or devices existing outside the confines of the module. Excellent electrical isolation can be achieved in modules produced using the present invention by producing metalized lids and/or substrates with metalized features or cavities used to isolate individual sections of circuits located on the same substrate or to isolate the module from the outside world. The techniques for design and metallization of such cavities and features will be known to those of skill in the art The practice of the current invention will not only improve and lower the cost of manufacturing optical and optoelectronic components, but also allow a vast array of new components and modules to be designed and produced. Examples of new components are detailed in the preferred embodiments.

In addition, currently assembly processes including component pick and place, and hermetic sealing can seamlessly integrate any embodiment of the current invention.

Components such as lenses and/or collimators, for example, can also be picked and placed using currently available pick and place equipment, with possibly some modifications of the picking assembly. Since collimators have a fiber pigtail attached, movement during final attachment is possible, misaligning aligned collimators. In this case, an apparatus can be constructed which holds the collimators or lenses in place during final attachment.

The present invention has been described in detail with respect to preferred embodiments, and it will now be apparent from the foregoing to those skilled in the art that changes and modifications may be made without departing from the invention in its broader aspect. The invention, therefore, covers all such changes and modifications as fall within the true spirit thereof.

DETAILED DESCRIPTION OF THE PREFERRED EMBODIMENTS

Figure 2:
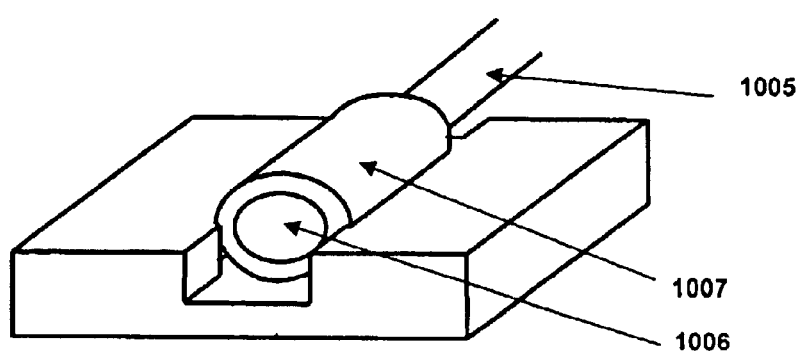
FIG. 2: A schematic drawing of a perspective view of a substrate as shown in FIG. 1 with an optical collimator positioned in features in the substrate.
Figure 3:
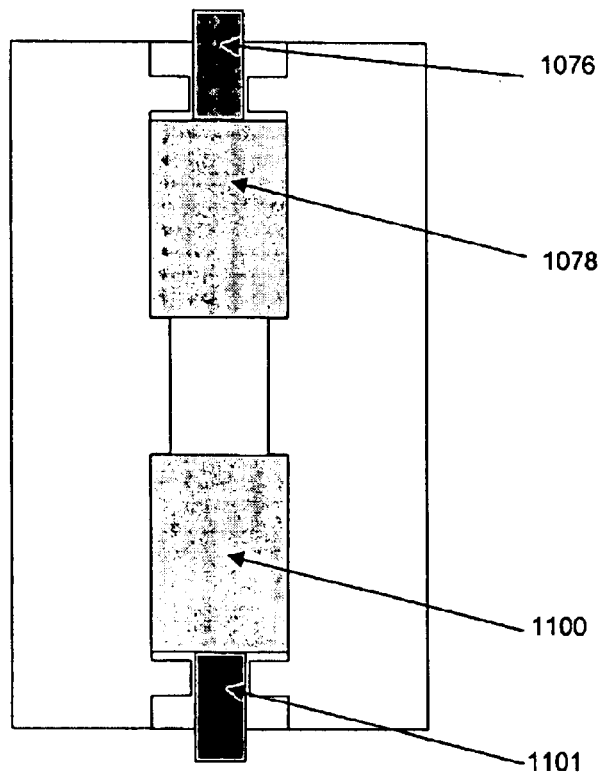
FIG. 3: A schematic drawing of a top view of the substrate shown in FIG. 2 illustrating an optical collimator and fiber cable positioned in features in the substrate.

Embodiment 1: Rectangular Features for Positioning and Attaching an Optical Component FIG. 1 is a perspective view illustrative of a simple mounting assembly containing rectangular features for the positioning, alignment and mounting optical components. The assembly can be, and is typically, a part of a larger more complex assembly which contains additional features. The assembly is formed in accordance with the teachings of the present invention. In general, the optical assembly 1000 includes a rectangular depression 1002 for the precise placement and positioning of a component. The assembly contains certain rectangular features 1003 which enable the proper placement and positioning as well as to prevent the collimator or other component from sliding within the depression. The features 1003 shown also have been designed to provide a clear optical path for light passing through a lens, collimator or other component which can be mounted in the feature. An optical fiber receptacle 1004 serves two roles in the current configuration. It is used for holding the fiber that is attached to the collimator allowing it to exit the assembly. It also serves as a place to epoxy the fiber in place and, when used in a module which contains a lid, to seal the opening of the module which contains a cover or lid with a similar feature which aligns with the receptacle 1004. The depression 1002 is shown with a constant depth, but this is not meant to be limiting. The depression can exhibit multiple depths. In addition, a portion or all of the depression can be metalized and coated with solder paste to attach a metalized component to the assembly using a reflow solder process in accordance with the teachings of the present invention. An epoxy attachment process could also be used. FIG. 2 depicts a perspective view of the optical assembly showing an optical collimator positioned in the features 1003. The fiber cable 1005 extends from the rear of the assembly, and the view shows the lens 1006, located in the collimator housing 1007, which couples the light into or out of the optical fiber located inside the fiber cable. The design of the features 1003 allow the light passing through the lens to be unobstructed thus providing a clear optical path from the collimator to some other component. FIG. 3 is a top view of an assembly containing two sets of the features shown in FIG. 2 wherein two optical collimators 1078 and 1100 and their respective optical fiber cables 1076, 1101 are shown positioned in the features. The optical axes of the optical collimators are aligned using said features. This configuration is shown to illustrate one of the simplest examples of the alignment of two optical components but is in no way meant to be limiting. It will be appreciated that any number of optical components can be operatively aligned on a pressed ceramic substrate containing alignment features, in accordance with the teachings of this invention.

Embodiment 2: Prototype Fiber Optic Component

Figure 4:
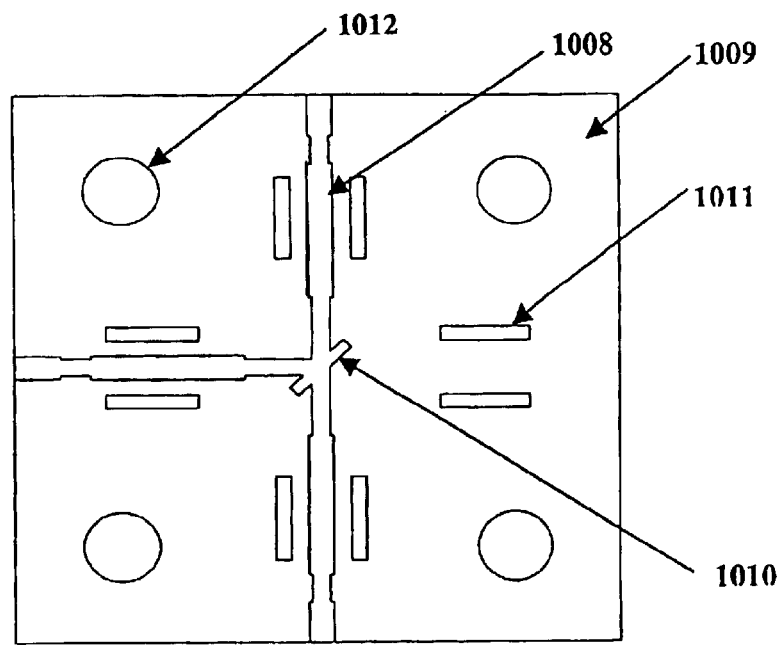
FIG. 4: A schematic drawing of a top view of a prototype fiber optic component designed to perform as an optical filter for separating optical channels each at different frequencies.
Figure 5:
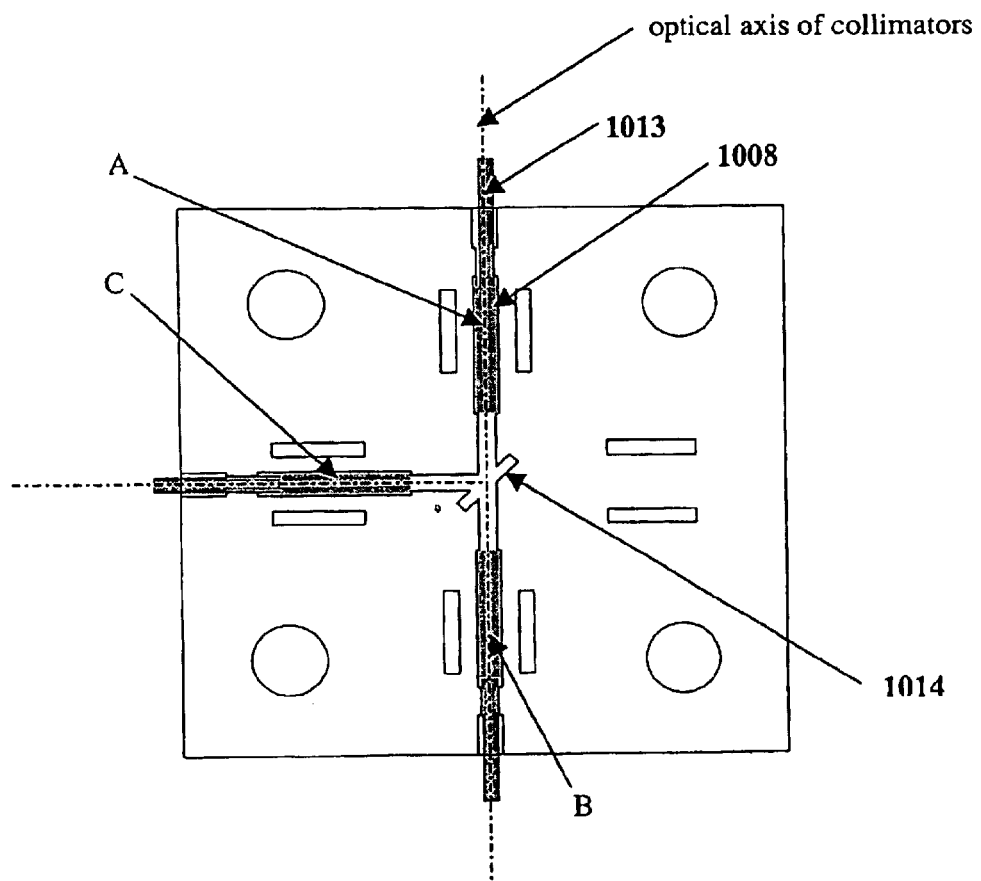
FIG. 5: A schematic drawing of a top view of a prototype fiber optic component as shown in FIG. 4 with several optical components shown positioned in features on the substrate.

FIGS. 4–7 depict schematic drawings of a prototype fiber optic component. The substrate 1009 in FIGS. 4 and 5 contains features 1008, which are similar to the features 1003 in FIG. 1, embodiment 1, for aligning and positioning three collimators A, B and C in FIG. 5, in accordance with the teachings of the present invention. The component was designed to perform as an optical filter, separating optical channels at different frequencies using a filter 1014 in FIG. 5, such as a thin film filter. The different optical channels are propagating in the optical fiber, located in the fiber cable 1013 in FIG. 5 and attached to the lens in the collimator A. Collimator A expands the optical beam propagating in the optical fiber and the optical beam propagates from collimator A to the filter 1014 where the optical channels are separated. Some of the channels at pre designated frequencies are reflected to collimator C and other channels at other pre designated frequencies are allowed to pass through the filter and enter collimator B. The particular frequency response of the filter depends upon the specific design of the filter and many variations are possible. Collimator A and C are placed perpendicular to each other where their optical axes intersect at the surface of the filter 1014, as shown in FIG. 5. The feature 1010 in FIG. 4 has been designed to position the filter 1014 in FIG. 5 precisely at the intersection of the optical axes of collimators A and C to achieve good optical coupling or low optical insertion loss between collimators A and C. All of the features 1008 in FIG. 4 have been designed to allow a clear optical path.

In order to show the coupling efficiency of one of the most simple optical systems, the substrate shown in FIG. 4 was constructed and a component as shown in FIG. 5 was assembled in accordance with the teachings of the present invention. In particular, two collimators A and B, as shown schematically in FIG. 5, were positioned and aligned using features 1008 as shown in FIG. 4. The collimators were purchased from Lightpath Technologies. No filter 1014 as shown in FIG. 5 was inserted. The 2 collimator system was hand assembled to test the insertion loss of light passing from collimator A to collimator B as shown in FIG. 5. The substrate 1009 in FIG. 4 was manufactured by machine milling unfired pressed ceramic which is not the ideal method of fabrication or several reasons including low through put. By using a die or mold to press these depressions, in accordance with the teachings of the present invention, significant reductions in the manufacturing time can be achieved. The substrate was then fired to form a stable substrate.

The above mentioned system was tested using a 1310 nm pigtailed laser that was connected to a pigtailed collimator. The other pigtailed collimator was attached to a pigtailed InGaAs PIN photodiode. The output of the laser was calibrated before being connected to the collimator. After the laser and photodiode were connected the collimators, the collimators were then placed into the features 1008 in FIG. 4 by hand without the use of any machinery. Once the collimators were in place the laser was then turned on and the output was monitored. An insertion loss of only 1.3 dB was measured after hand placing the optical components in the appropriate locations, clearly demonstrating the ability of a substrate 1009 as shown in FIG. 4 containing features 1008 as shown in FIG. 4 to accurately align optical components. The features 1008 shown in FIG. 4 could be metalized and coated with a layer of solder paste to permanently attach collimators with metal housings using a reflow solder process.

Figure 6:
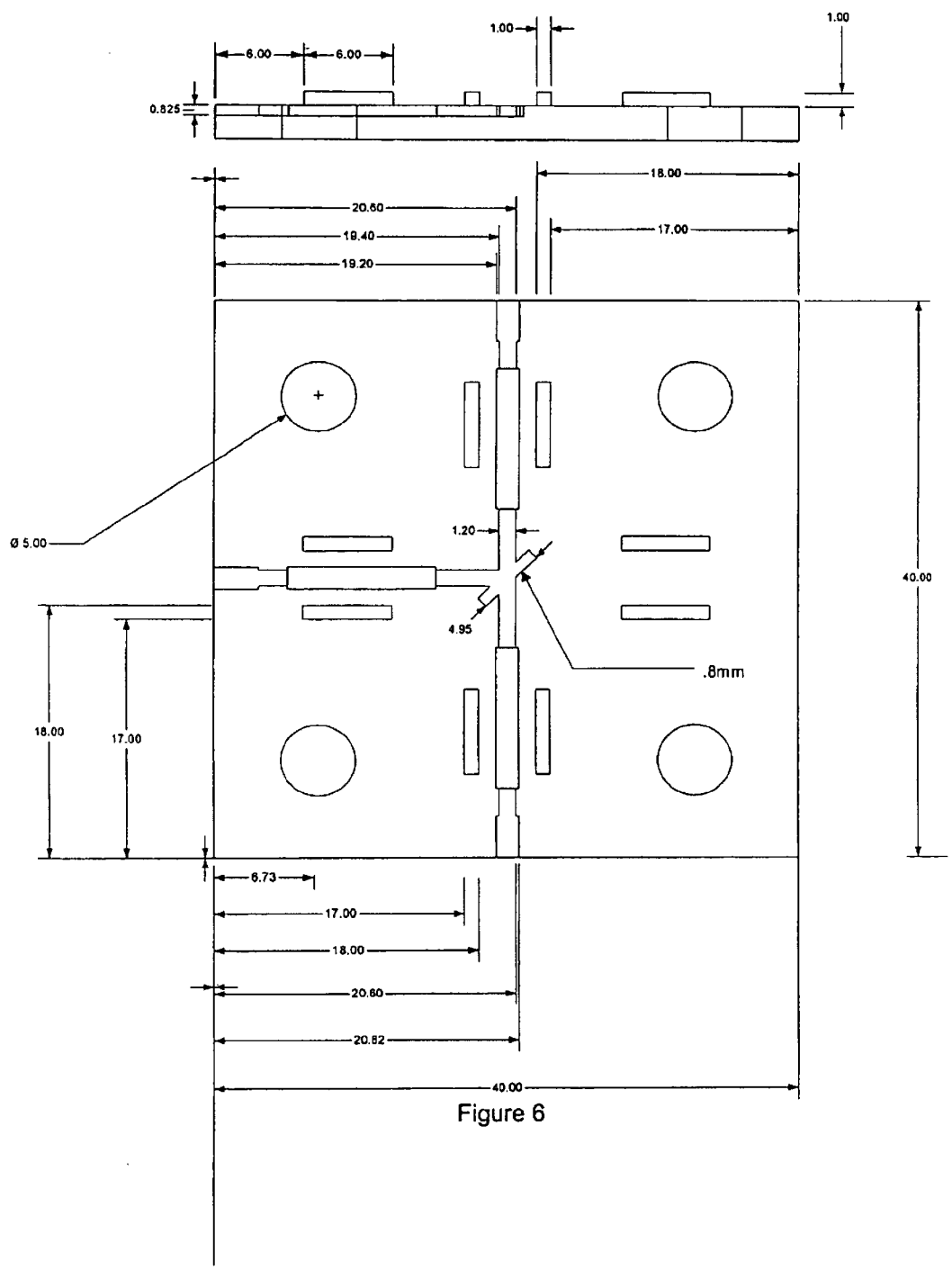
FIG. 6: A schematic drawing of a top view of a prototype fiber optic component as shown in FIG. 4 with dimensions. This drawing was used to produce a prototype substrate.
Figure 7:
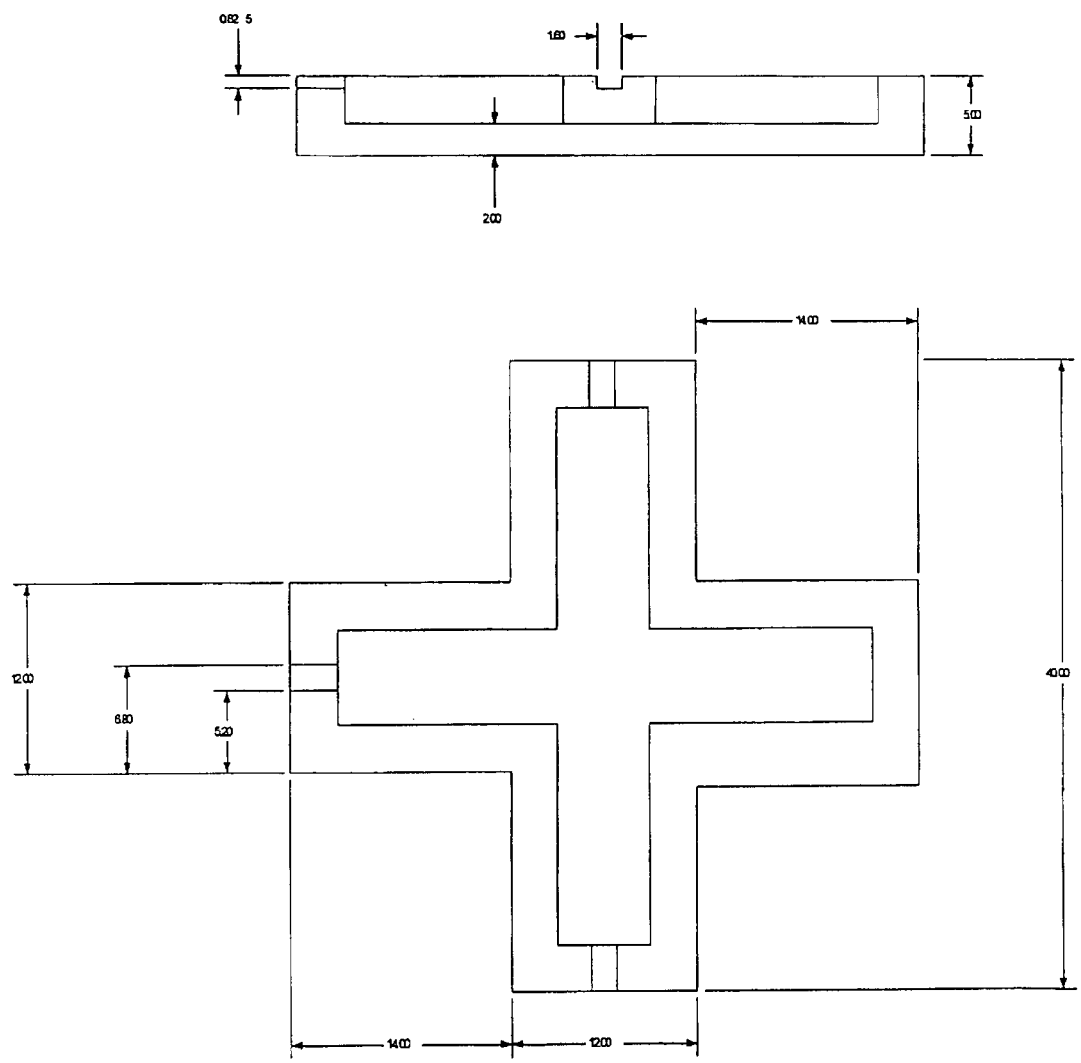
FIG. 7: A schematic drawing of a top view of a lid or cover of the prototype fiber optic component shown in FIG. 6 with dimensions.

The substrate 1009 in FIG. 4 also contains features 1011 and 1012. The circular features 1012 are holes which were machined into the ceramic. In production, these holes would be pressed in accordance with the teachings of the present invention. These holes were designed to allow the substrate to be mounted to another assembly using screws or some other mounting device. The features 1012 were designed to align a cover or lid assembly. FIGS. 6 and 7 depict schematic drawings of the substrate as shown in FIG. 4, and a lid or cover, respectively.

Embodiment 3: Laser Diode Module

Figure 8:
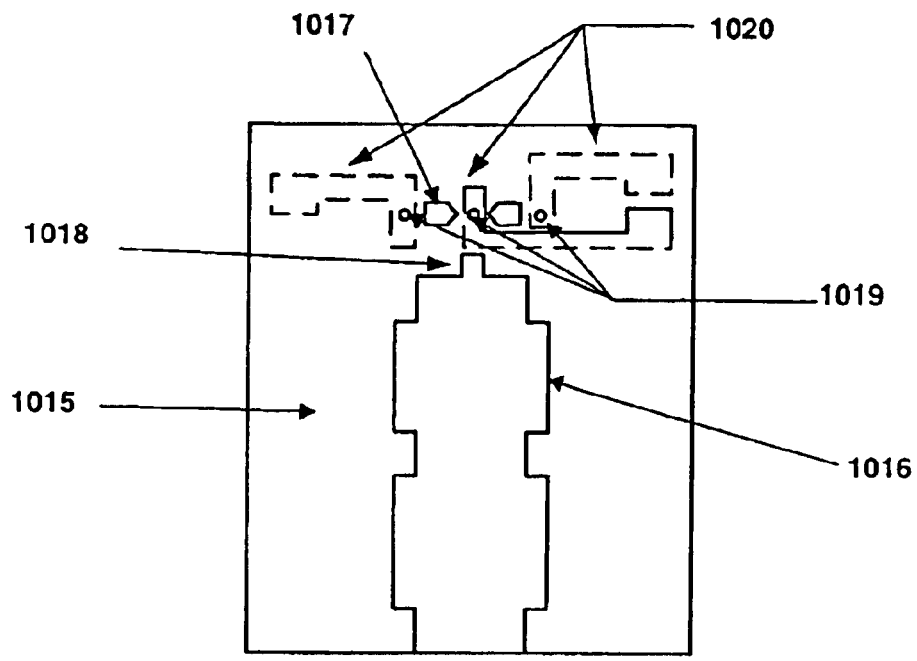
FIG. 8: A schematic drawing of a top view of a substrate used for producing a laser diode module.

FIG. 8 depicts a schematic drawing of a substrate for assembling a laser diode module. The substrate 1015 contains features 1016, which are recesses defined in 1015 for aligning and positioning optical components, as well as features 1017 for positioning and aligning a semiconductor laser diode. In this case, the laser diode is flip chip mounted and contains features similar to features 1017, except the features are protruding from the surface of the laser diode to communicate with the features 1017, which extend into the substrate. In addition, substrate 1015 contains metal filled through hole vias 1019 and metal interconnect lines 1020 for electrical interconnection. These features allow the p and n contacts of the laser diode to be made using a reflow solder process, and the metal interconnect lines 1020 allow the laser diode to be connected to some other assembly. This arrangement eliminates the need for any wire bonding processes, which are replaced with reflow solder processes. Moreover, such metal filled through hole vias provide a means of removing heat from the laser diode, providing an excellent thermal management solution.

The features 1016 for aligning optical components are similar to features 1008 in FIG. 4. In this case, however, features 1016 have been designed to hold a lens and a collimator. If a collimator in an infinite conjugate arrangement is used, then an additional lens is required to expand the output of the laser diode and form an infinite conjugate pair with the collimator. In addition, the use of a lens close to the laser diode in an infinite conjugate arrangement allows the distance of the laser/lens system to be positioned a distance from the collimator without substrate bow substantially degrading the coupling efficiency as described in the teachings of the present invention.

An additional feature 1018 is also shown in FIG. 8. This feature a recess, extends slightly from feature 1016 underneath the laser diode output facet to prevent the substrate from clipping or blocking the optical output of the laser diode.

Figure 9:
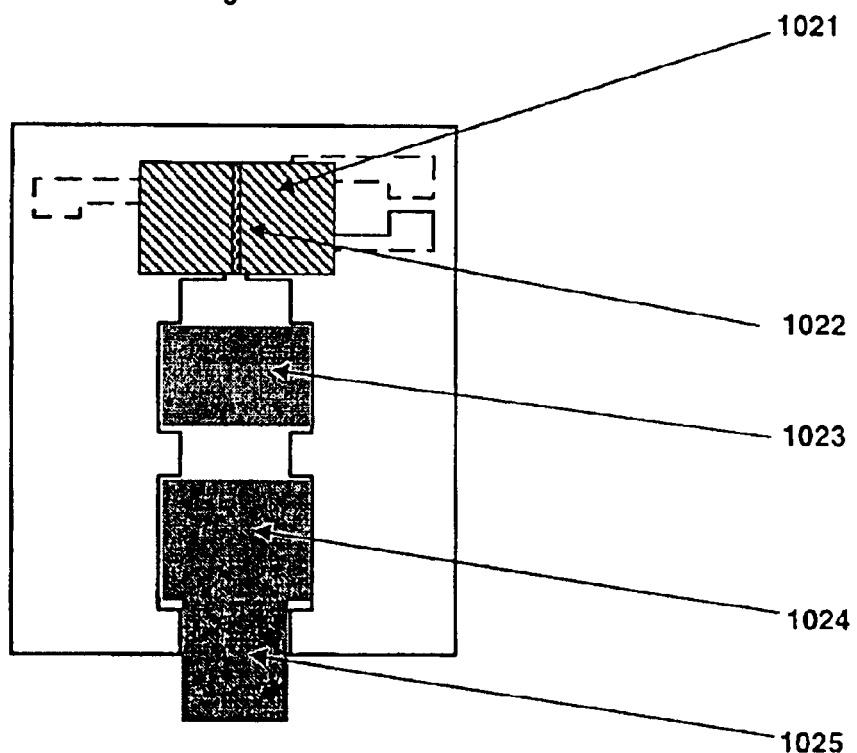
FIG. 9: A schematic drawing of a top view of a substrate used for producing a laser diode module as shown in FIG. 8 with components shown positioned into features in the substrate.

FIG. 9 depicts a schematic illustration of the laser diode module with a laser diode 1021 shown flip chip mounted onto the metalized substrate. The laser waveguide 1022 which is located underneath the laser diode in the present view, and is contacted to a metal contact pad underneath the laser diode which is in contact with the metal filled vias 1019 in FIG. 8, is also shown and aligns with the feature 1018 described above. In FIG. 9, a lens 1023, and a collimator 1024 with fiber cable 1025 is also shown. The lens 1023 as well as the features 1016 in FIG. 8, can be metalized and the lens attached to the substrate using a reflow solder process.

Embodiment 4: Laser Diode Module with Photodiode Back Side Facet Monitor Integrated Using Sub Mount, and Integrated Thin Film Filter for Wavelngth Control FIGS. 10–13 depict schematic drawings of another embodiment of the current invention. In this case, the laser diode module described in embodiment 3 is expanded to include two other components. One component is a back side facet power monitor which consists of a photodiode in a sub assembly. The sub assembly allows the photodiode to be mounted perpendicular to the output of the back facet of the laser diode. The second component is a thin film filter which consists of multiple optical coatings deposited on a substrate transparent in the wavelength of operation of the laser diode. The present invention allows such a filter to be accurately positioned in close proximity to the back facet of the laser diode. The back facet of the laser diode would have deposited on it an anti reflection coating so that the optical cavity would consist of the front facet, which would also be coated, and the thin film filter providing a spectrally filtered feedback. In particular, the filter would be designed to provide feedback (i.e., exhibit a high reflectivity) at a pre determined frequency band. This arrangement would cause the output of the laser diode to be spectrally centered at the frequencies around the frequency band of the filter. Moreover, the filter would allow a certain amount of optical power to pass through it and couple to the photodiode, which would serve to monitor the back facet output power.

Figure 10:
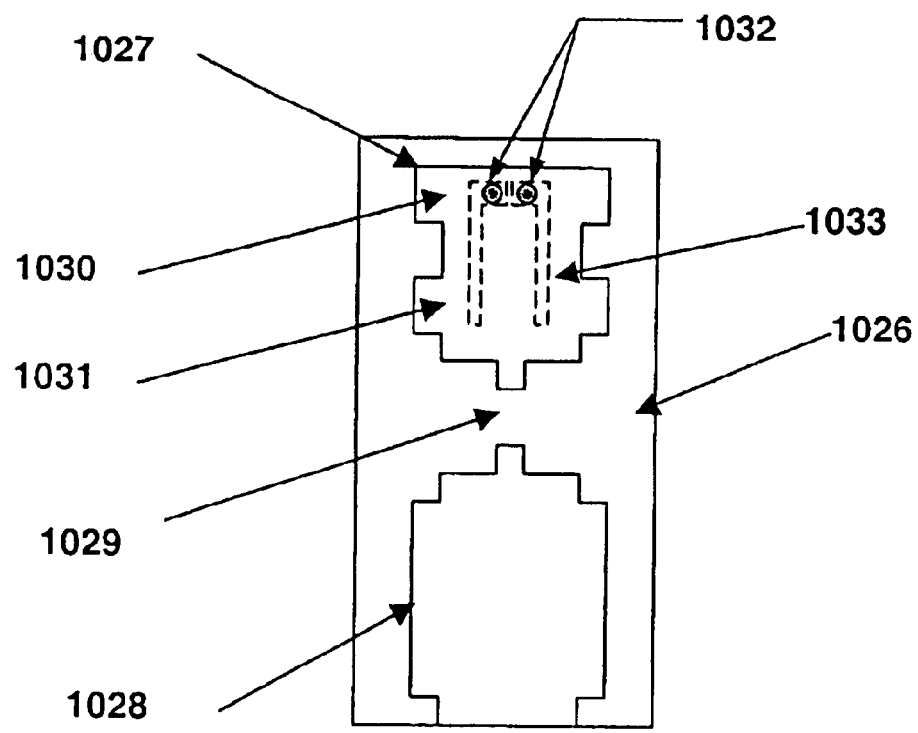
FIG. 10: A schematic drawing of a top view of a substrate used for producing a laser diode module with features for positioning a sub mount containing a photodiode for back facet power monitoring, and features for positioning a thin film filter for controlling the wavelength of the laser diode.

FIG. 10 depicts a substrate 1026 containing features 1027 for aligning the photodiode sub mount, thin film filter, and features 1028 for aligning the lens. The rest of the laser diode module is not shown. In addition, the features and metal interconnects shown in FIG. 8, which would have been present in area 1029 in FIG. 10 are not shown in FIG. 10 for simplicity. Specifically, the photodiode sub mount is positioned in region 1030 and the thin film filter is positioned in region 1031. Region 1030 also contains two metal filled through hole vias 1032 for connecting the photodiode module electrically to contacts 1033 located on the back of the substrate. These contacts can be used to electrically connect the photodiode to another assembly.

Figure 11:
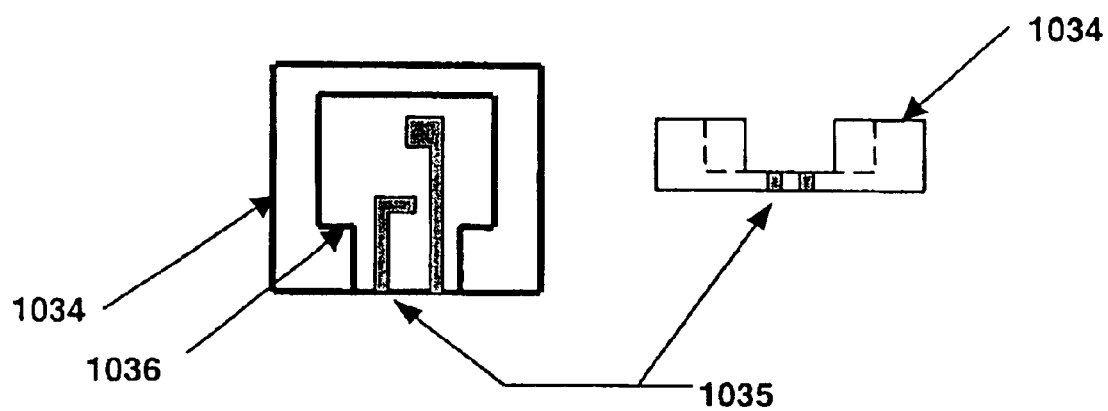
FIG. 11: A schematic drawing of a top view and side view of a sub mount used for mounting a photodiode for back facet power monitoring.

FIG. 11 depicts a schematic drawing of the front and bottom views of a sub mount 1034 for positioning the photodiode. The sub mount contains patterned metal interconnect lines 1035 which extend over the side of the sub mount. These metal interconnects are designed to make contact to the metal features 1032 in FIG. 10. Attachment can be done using a reflow solder process. In addition, the sub mount shown in FIG. 11 also contains a depression 1036, which facilitates the alignment of the photodiode to the metal contacts. Other such features are possible, such as features 1017 in FIG. 8.

Figure 12:
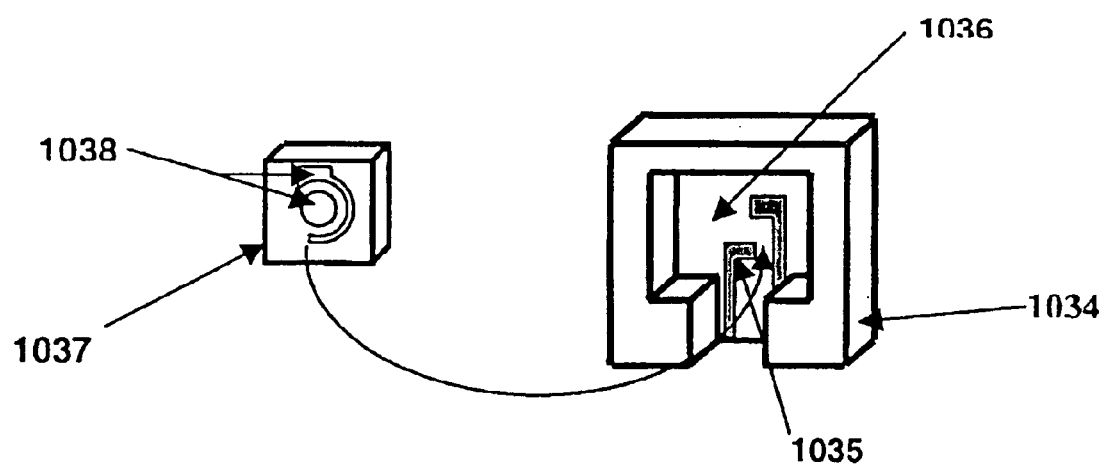
FIG. 12: A schematic drawing of a perspective view of a photodiode chip and a sub mount.

FIG. 12 depicts a photodiode chip 1037 and the sub mount 1034 shown in FIG. 11. The photodiode is flip chip bonded to the sub mount 1034 using reflow solder processes. The depression 1036 guides the alignment of the photodiode contacts 1038 to the sub mount metal interconnect lines 1035.

Figure 13:
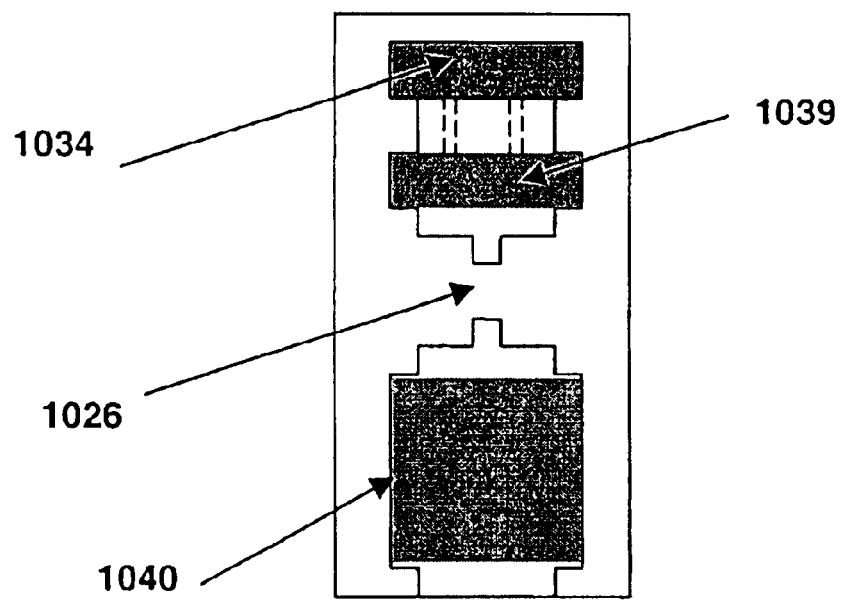
FIG. 13: A schematic drawing of a top view of a substrate used for producing a laser diode module as shown in FIG. 10 with several optical components shown positioned in features in the substrate.

FIG. 13 depicts a substrate 1026, which is similar to substrate 1026 shown in FIG. 10, wherein the photodiode sub mount 1034, thin film filter 1039 and lens 1040 are shown in position. The entire assembly can be produced without any wire bonding operations.

Embodiment 5: A Multichannel Wavelength Division Multiplexer (WDM)

Figure 14:
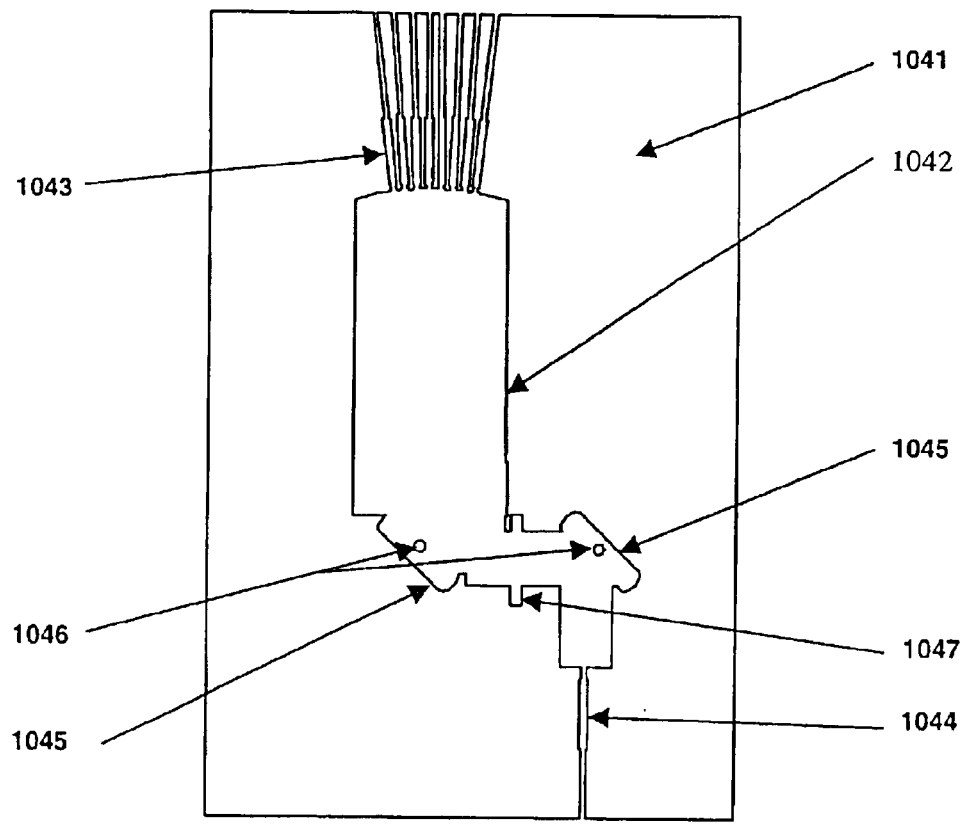
FIG. 14: A schematic drawing of a top view of a substrate used for producing a wavelength division multiplexer/demultiplexer (WDM).

Wavelength division multiplexers and demultiplexers (WDMs) are a critical fiber optic component for fiber optic communications. WDMs either combine or separate multiple optical channels each at a different frequency. FIG. 14 depicts a substrate 1041 containing features 1042, 1043, 1044, 1045, 1046, and 1047 for aligning and positioning several optical components, producing such a device. The large feature 1042 serves to provide a clear optical path for beams propagating from component to component and, in this case in particular, from a grating to eight collimators. Features 1043 and 1044 align and position input and output collimators and the attached fiber cables. Features 1045 hold a sub mount which has an optical grating attached to it. The optical grating serves to separate the optical channels. This sub mount is thick enough to have a hole formed in the bottom surface to receive a projection 6, which serves to align the sub mount and grating and allow for tuning of the final structure. In this case, the grating can be rotated to correctly align the spatially separated optical channels to the desired collimators positioned in features 1043. The bottom of the sub mount can be metalized for reflow solder attachment once any required tuning is completed. Rotating the sub mount for tuning can be done using a computer controlled machine interfaced with a spectrum analyzer attached to the output of one of the optical collimators, and the machine can hold the sub mount in place while a reflow solder attachment process is performed. Features 1045 accommodating two gratings are depicted in FIG. 14. Moreover, an additional feature 1047 is shown. Feature 7 holds a polarization rotation device, rotating the polarization of optical beams passing through it by 90 degrees. Thus, an optical beam exiting a collimator positioned in feature 1044 interacts with a grating which is attached to a sub mount and positioned in feature 1045 and upon reflection, passes through a polarization rotating device positioned in feature 1047 (which may be angled slightly to improve optical return loss) then interacts with a second grating and propagates to a given collimator positioned in features 1043. This arrangement reduces the polarization dependant loss associated with a typical grating. By using two identical gratings but rotating the polarization between them, each polarization of light experiences roughly the same optical loss when passing through the module. In addition, the use of two gratings enhances the separation of the optical channels.

Figure 15:
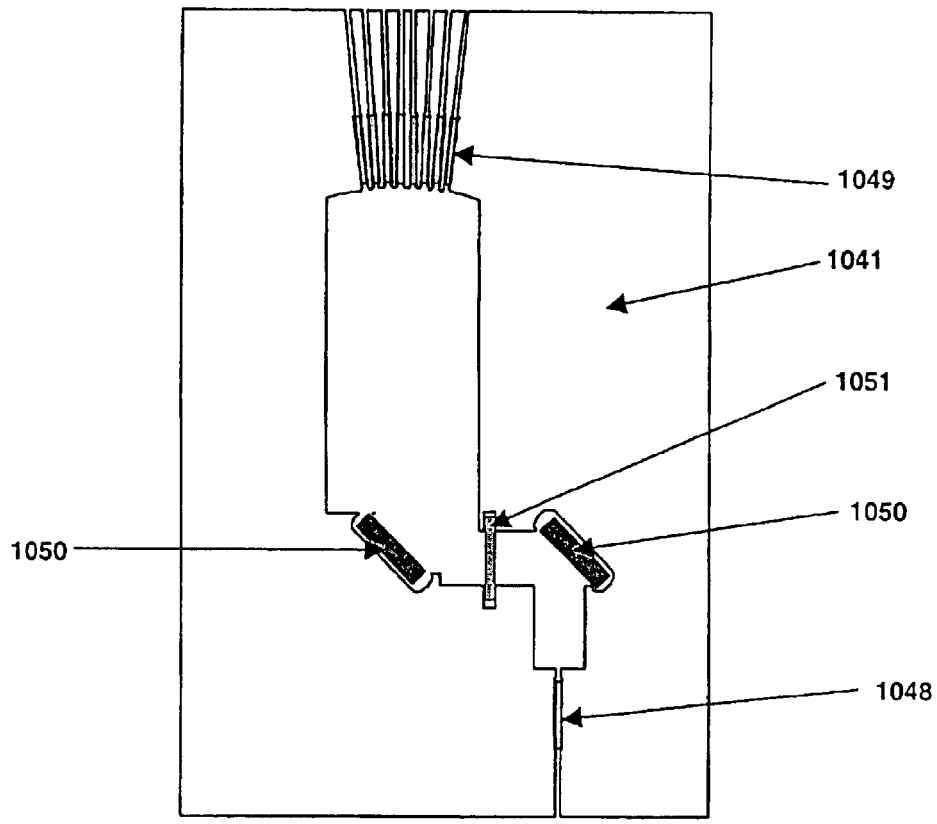
FIG. 15: A schematic drawing of a top view of a substrate used for producing a wavelength division multiplexer/demultiplexer (WDM) with components shown in features in the substrate.

FIG. 15 depicts a substrate 1041 as shown in FIG. 14 with an input collimator 1048 (which would be an output collimator if the module was used as a multiplexer), output collimators 1049, two gratings 1050 mounted on a sub mount, and a polarization rotation device 1051.

Figure 16:
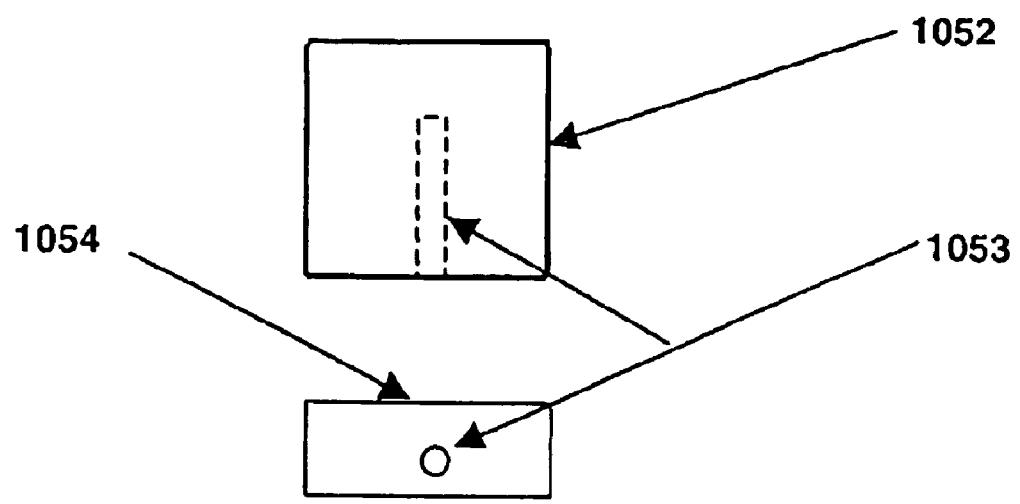
FIG. 16: A schematic drawing of a top and side view of a sub mount used for positioning an optical component such as an optical grating.

FIG. 16 depicts a sub mount 1052 with a cylindrical feature 1053 which would interface with the cylindrical projection 1046 shown in FIG. 14. The grating would be attached to the surface 1054 in FIG. 16. Both the back side of the grating and the surface 1054 can be metalized, and the surface 1054 coated with solder paste, to allow the grating to be attached using a reflow solder process.

Embodiment 6: A Multi Wavelength 980 Nanometer Pump Laser Module

Reliable high power pump laser modules for pumping Erbium doped (or co doped) optical amplifiers are critical optical components for telecommunications applications. High power pump modules are needed for many so called long haul or distribution applications. One approach for producing pump laser modules with high optical output powers is to combine the outputs of several laser diodes operating at slightly different frequencies so that their spectra do not overlap.

Figure 17:
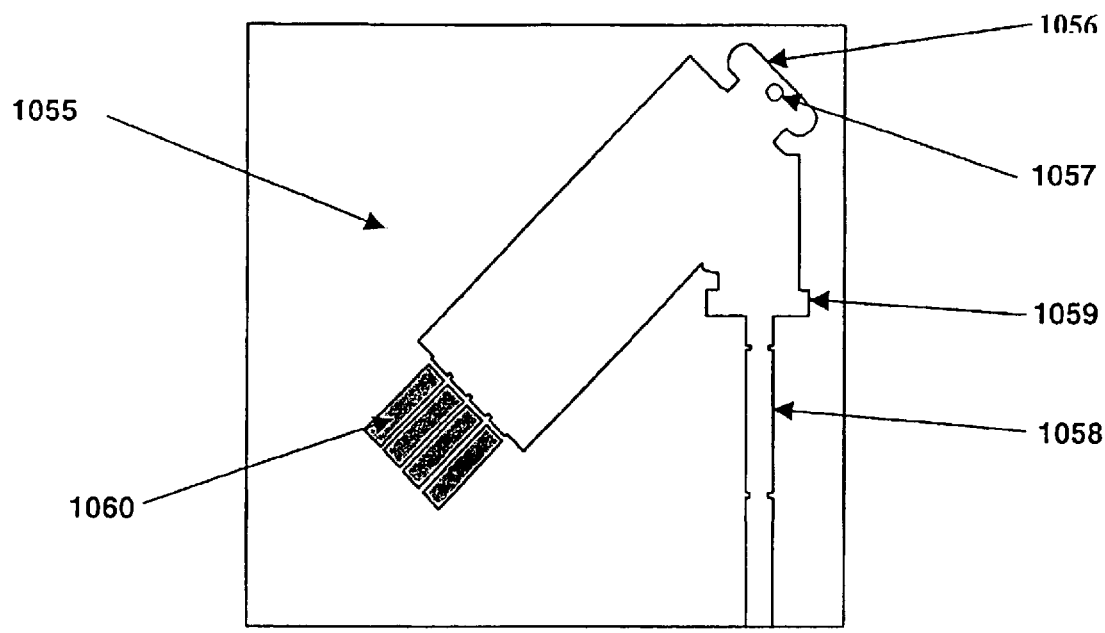
FIG. 17: A schematic drawing of a top view of a substrate used for producing a multiple laser diode, multiple wavelength pump laser.

FIG. 17 depicts a schematic drawing of a substrate 1055 with features 1056, 1057, 1058 and 1059 for aligning and positioning optical components and sub mounts. Features 1056 and 1057 are used to position a sub mount with an attached grating, as described in Embodiment 5. Feature 1058 holds the output collimator and feature 1059 holds a partially reflecting mirror. This mirror will form an optical cavity with the back facet of the laser diodes, which will be coated to provide a desired reflectivity. The front facet of the laser diode will be coated with an anti reflection coating. The module shown schematically in FIG. 17 contains four laser diodes, but more or less could be employed. The features and laser diode configurations are shown as features 1060 in FIG. 17 for simplicity. The actual layout would closely resemble that shown in FIG. 10, except that feature 1060, which holds an optical thin film filter, would not be present. The spectral output of each of the laser diodes would depend upon several items including the spectral response of the grating used and the position of the laser diodes.

Figure 18:
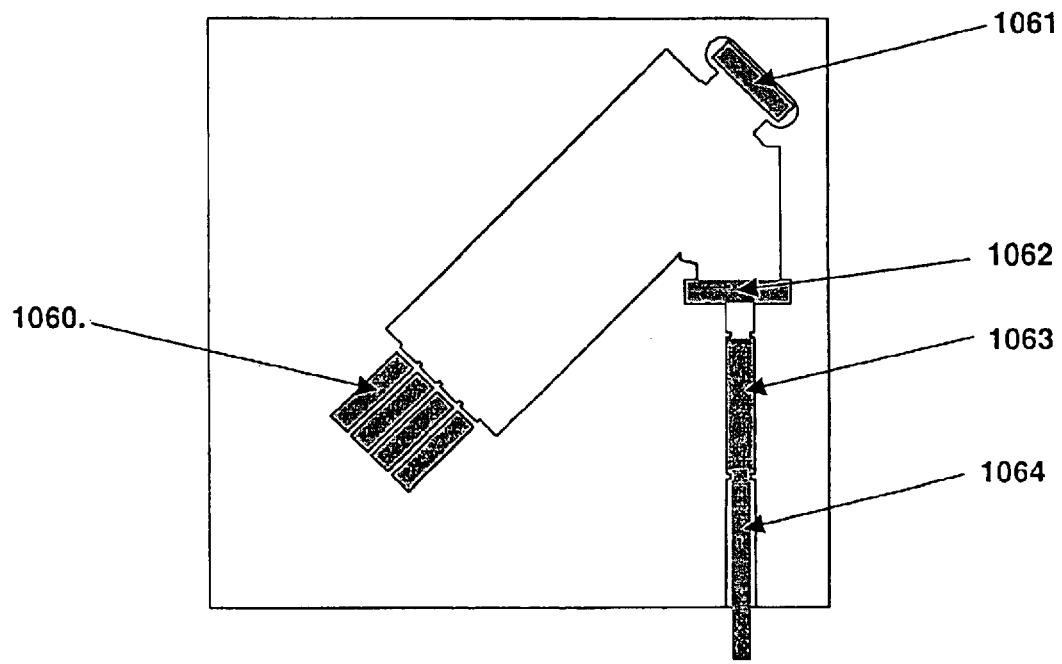
FIG. 18: A schematic drawing of a top view of a substrate used for producing a multiple laser diode, multiple wavelength pump laser with components shown in features in the substrate.

FIG. 18 depicts a substrate with several optical components positioned in the features 1056, 1058 and 1059 as shown in FIG. 17. The substrate holds a sub mount 1061 which contains a grating as described in FIGS. 15 and 16 in embodiment 5. The substrate also holds a partially reflecting mirror 1062 and a collimator 1063 with fiber cable 1064.

Of course, the substrate, as with any substrate discussed in these embodiments, can contain features for mechanically mounting the substrate similar to feature 1012 in FIG. 4, or other features useful for aligning or positioning a cover or lid in accordance with the teachings of the present invention.

Embodiment 7: An Angled Feature for Coupling an Optical Beam to a Photodiode

Figure 19:
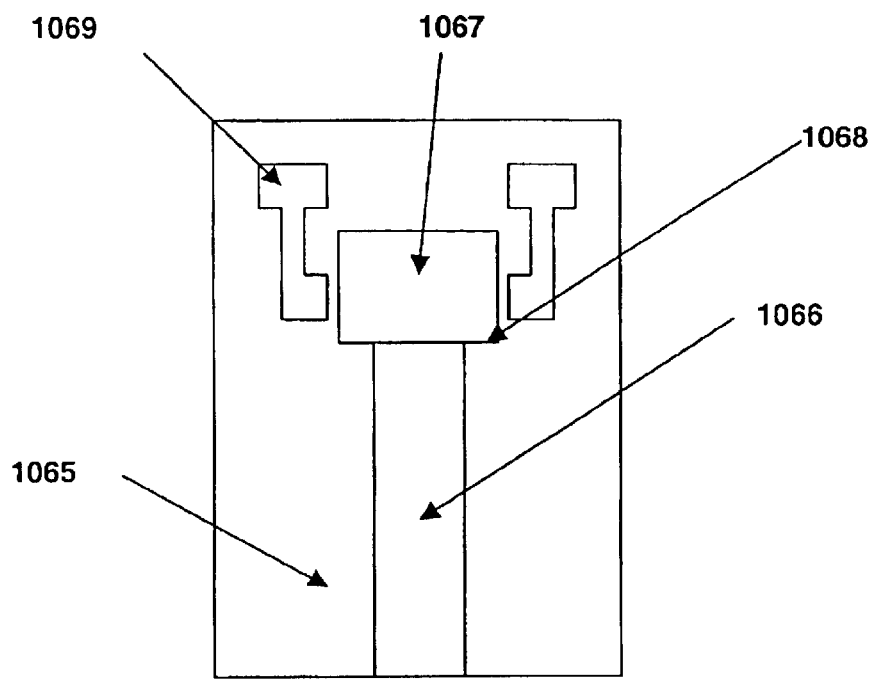
FIG. 19: A schematic drawing of a top view of a portion of a substrate containing a flat angled feature to couple an optical beam onto the active region of a photodiode.
Figure 20:
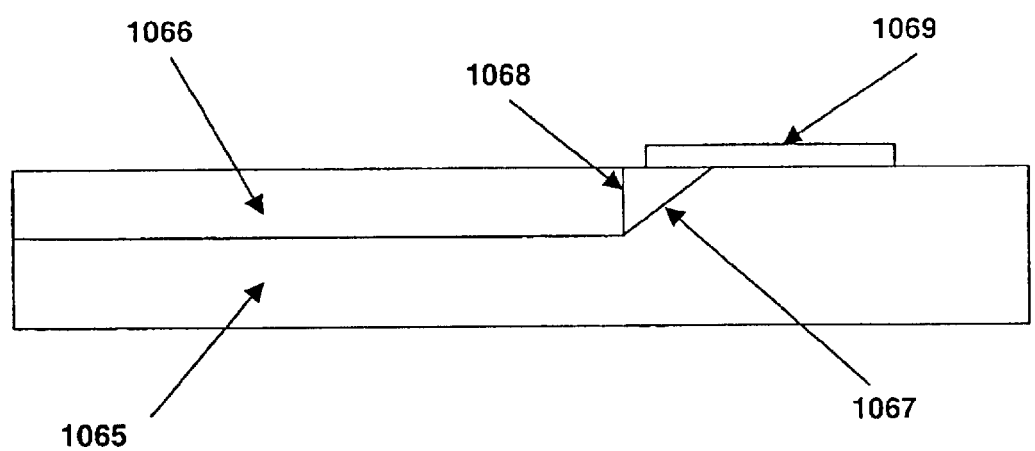
FIG. 20: A schematic drawing of a side view of a portion of a substrate containing a flat angled feature to couple an optical beam onto the active region of a photodiode.
Figure 21:
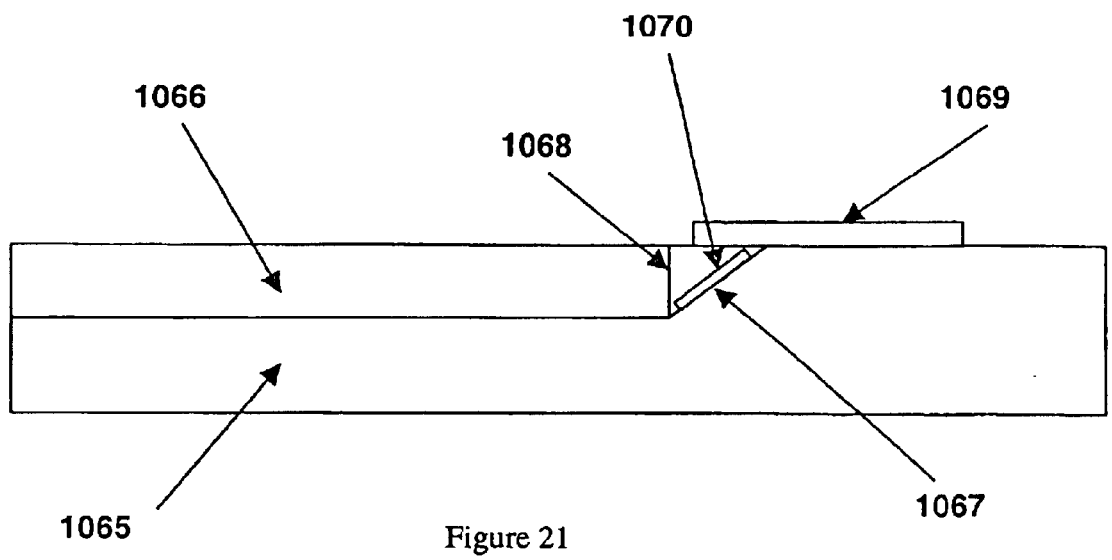
FIG. 21: A schematic drawing of a side view of a portion of a substrate containing a flat angled feature to couple an optical beam onto the active region of a photodiode. A mirror is shown positioned against the angled surface.
Figure 22:
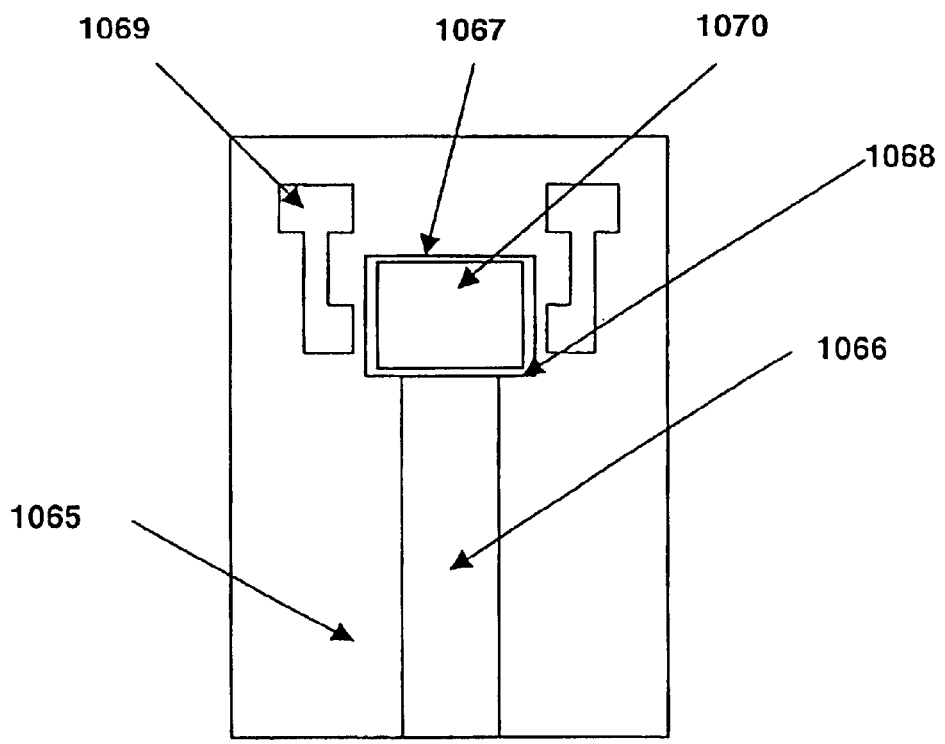
FIG. 22: A schematic drawing of a top view of a portion of a substrate containing a flat angled feature to couple an optical beam onto the active region of a photodiode, where a mirror is shown positioned over the angled surface.
Figure 23:
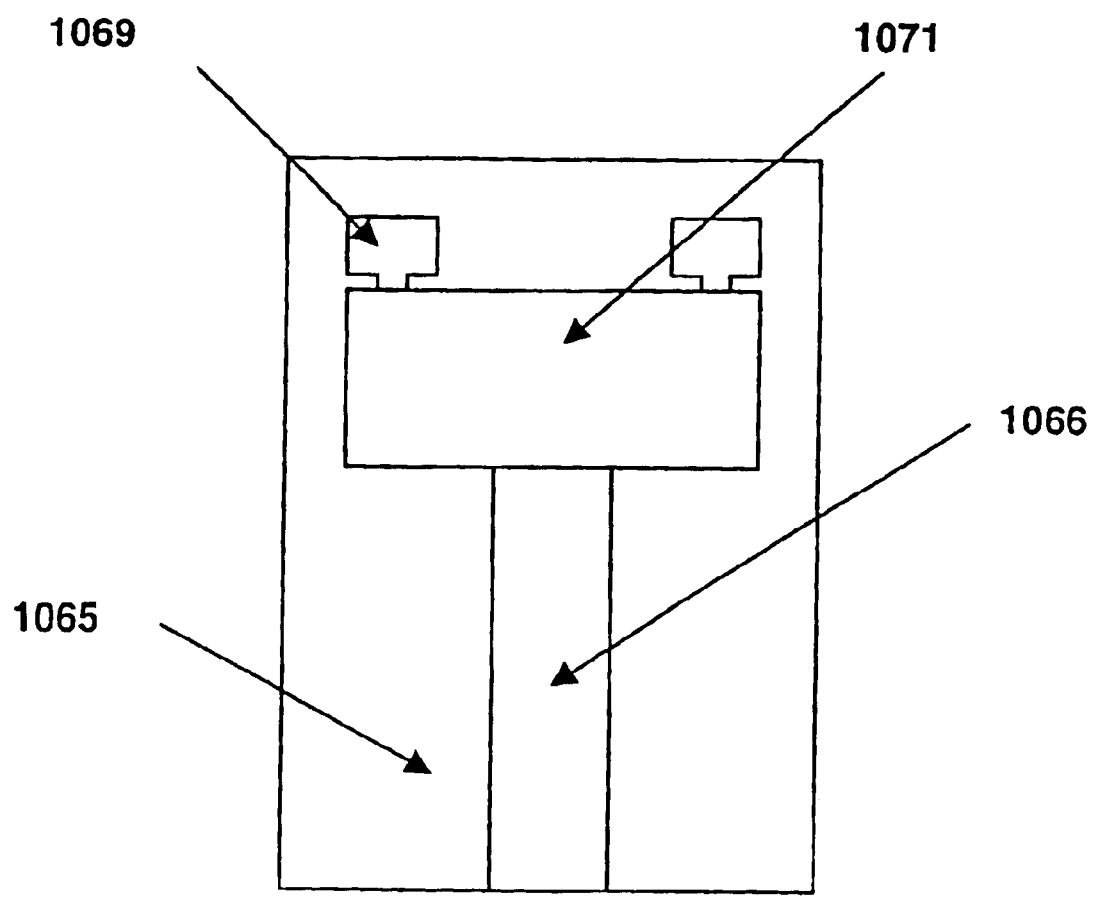
FIG. 23: A schematic drawing of a top view of a portion of a substrate containing a flat angled feature to couple an optical beam onto the active region of a photodiode, where a photodiode is positioned above the mirror.

This embodiment illustrates a means of implementing a flat pressed ceramic surface positioned at a 45 degree angle with respect to the surface of the substrate to hold a mirror, which can be a metalized rectangular section of a Silicon wafer, to reflect a beam, propagating parallel to the substrate in a groove, 90 degrees to couple to the active region of a photodiode which is mounted such that the active region is face down on the substrate. FIG. 19 illustrates a substrate 1065 with a groove 1066 for providing a clear optical path for an optical beam propagating across the substrate. An angled surface 1067 positions a mirror at a 45 degree angle with respect to the surface of the substrate. An edge 1068 keeps the mirror from sliding into the groove during attachment. Metal contracts 1069 are the electrical interconnects for connecting the photodiode to the rest of the circuit, which would extend beyond what is shown here. FIG. 20 depicts a schematic illustration of a side view of the substrate 1065 where the angled surface 1067 is shown. FIG. 21 depicts another side view of the substrate 1065 where a mirror 1070 is shown positioned against the angled surface 1067. FIG. 22 depicts a top view of the substrate 1065 with a mirror 1070 shown positioned against the angled surface 1067 and held in place using the edge 1068. FIG. 23 depicts a top view of the substrate 1067 with a photodiode die 1071 shown flip chip bonded over the mirror.

Figure 24:
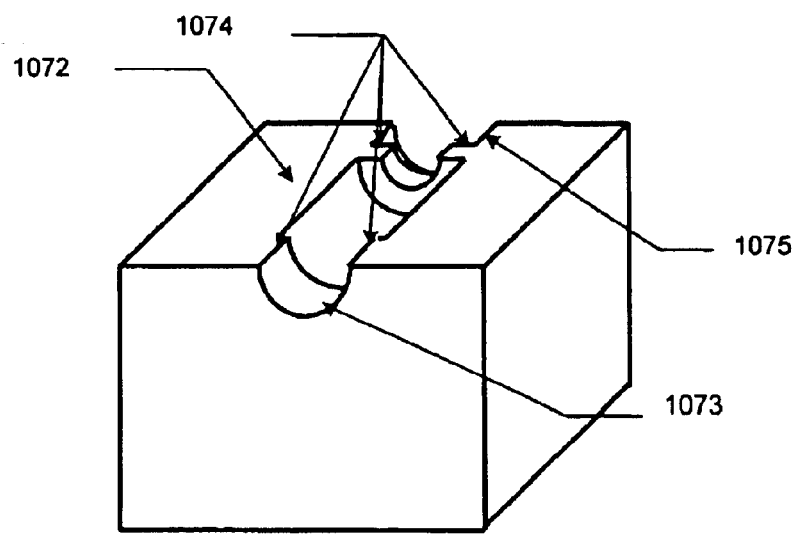
FIG. 24: A schematic drawing of a perspective view of a substrate for mounting an optical component such as a lens or collimator, according to another embodiment of the invention.
Figure 25:
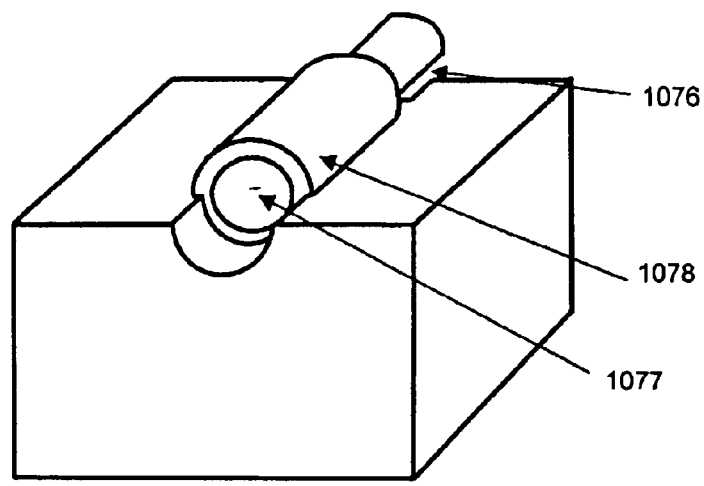
FIG. 25: A schematic drawing of a perspective view of a substrate as shown in FIG. 24 with an optical collimator positioned in cylindrical features in the substrate.
Figure 26:
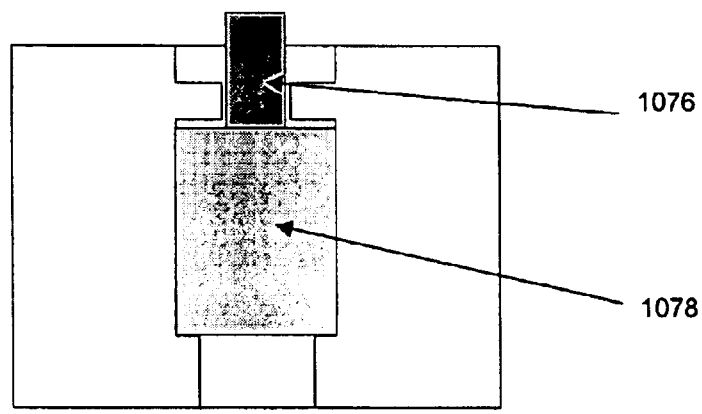
FIG. 26 A schematic drawing of a top view of the substrate shown in FIG. 24 illustrating an optical collimator and fiber cable positioned in cylindrical features in the substrate.

Embodiment 8: Cylindrical Features for Positioning and Attaching an Optical Component FIG. 24 is a perspective view illustrative of a simple mounting assembly containing cylindrical features for the positioning, alignment and mounting optical components. The assembly can be, and is typically, a part of a larger more complex assembly which contains additional features. The assembly is formed in accordance with the teachings of the present invention. In general, the optical assembly 1072 includes a cylindrical depression 1073 for the precise placement and positioning of a component. The assembly contains certain features 1074 which enable the proper placement and positioning as well as to prevent the collimator or other component from sliding within the depression. The features 1074 shown also have been designed to provide a clear optical path for light passing through a lens, collimator or other component which can be mounted in the feature. A cylindrical optical fiber receptacle 1075 serves two roles in the current configuration. It is used for holding the fiber that is attached to the collimator allowing it to exit the assembly. It also serves as a place to epoxy the fiber in place and, when used in a module which contains a lid, to seal the opening of the module which contains a cover or lid with a similar feature which aligns with the receptacle 1075. In addition, a portion or all of the depression can be metalized and coated with solder paste to attach a metalized component to the assembly using a reflow solder process in accordance with the teachings of the present invention. An epoxy attachment process could also be used. FIG. 25 depicts a perspective view of the optical assembly showing an optical collimator positioned in the features 1074. The fiber cable 1076 extends from the rear of the assembly, and the view shows the lens 1077, located in the collimator housing 1078, which couples the light into or out of the optical fiber located inside the fiber cable. The design of the features 1074 allow the light passing through the lens to be unobstructed thus providing a clear optical path from the collimator to some other component. FIG. 26 is a top view of the assembly shown in FIG. 25.

Figure 27:
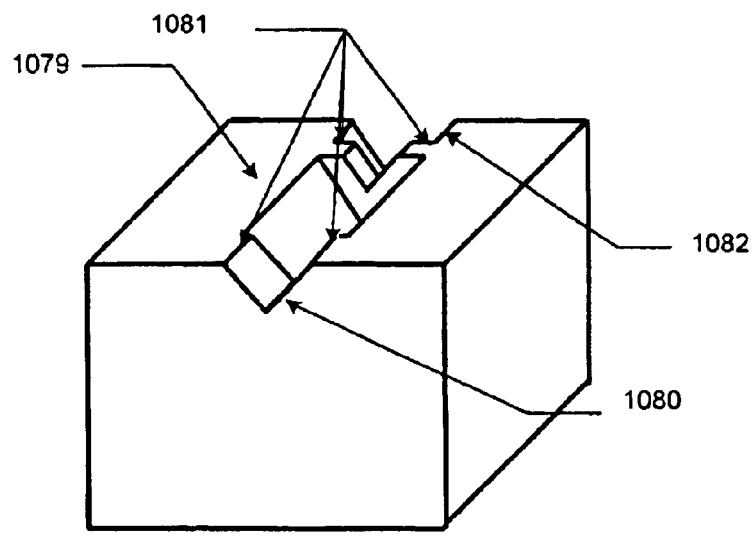
FIG. 27: A schematic drawing of a perspective view of a substrate for mounting an optical component such as a lens or collimator, according to another embodiment of the invention.
Figure 28:
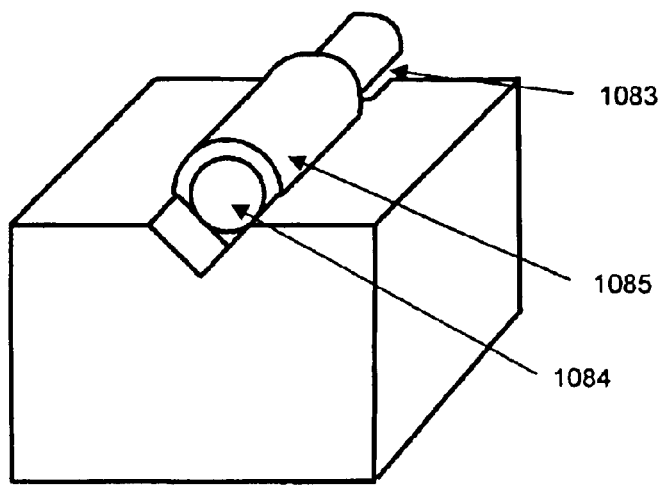
FIG. 28: A schematic drawing of a perspective view of a substrate as shown in FIG. 27 with an optical collimator positioned in V-shaped features in the substrate.
Figure 29:
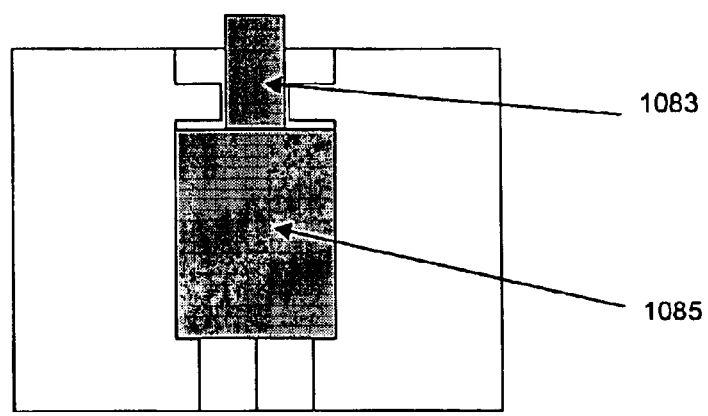
FIG. 29: A schematic drawing of a top view of the substrate shown in FIG. 27 illustrating an optical collimator and fiber cable positioned in V-shaped features in the substrate.

Embodiment 9: V-Shaped Features for Positioning and Attaching an Optical Component FIG. 27 is a perspective view illustrative of a simple mounting assembly containing v-shaped features for the positioning, alignment and mounting optical components. The assembly can be, and is typically, a part of a larger more complex assembly which contains additional features. The assembly is formed in accordance with the teachings of the present invention. In general, the optical assembly 1079 includes a v-shaped depression 1080 for the precise placement and positioning of a component. The assembly contains certain features 1081 which enable the proper placement and positioning as well as to prevent the collimator or other component from sliding within the depression. The features 1081 shown also have been designed to provide a clear optical path for light passing through a lens, collimator or other component which can be mounted in the feature. A v-shaped optical fiber receptacle 1082 serves two roles in the current configuration. It is used for holding the fiber that is attached to the collimator allowing it to exit the assembly. It also serves as a place to epoxy the fiber in place and, when used in a module which contains a lid, to seal the opening of the module which contains a cover or lid with a similar feature which aligns with the receptacle 1082. In addition, a portion or all of the depression can be metalized and coated with solder paste to attach a metalized component to the assembly using a reflow solder process in accordance with the teachings of the present invention. An epoxy attachment process could also be used. FIG. 28 depicts a perspective view of the optical assembly showing an optical collimator positioned in the features 1081. The fiber cable 1083 extends from the rear of the assembly, and the view shows the lens 1084, located in the collimator housing 1085, which couples the light into or out of the optical fiber located inside the fiber cable. The design of the features 1081 allow the light passing through the lens to be unobstructed thus providing a clear optical path from the collimator to some other component. FIG. 29 is a top view of the assembly shown in FIG. 28.

Production of a Mold, Positioning Ceramic Powder into a Mold and Forming a Substrate with Multiple Levels and Projections Via Dry Pressing of Ceramic Powder.

A method for producing the substrate shown in FIGS. 4, 5 and 6, which employs processes used by those skilled in forming pressed ceramics, consists of the following steps:

Step 1: Production of a Mold.

Figure 30:
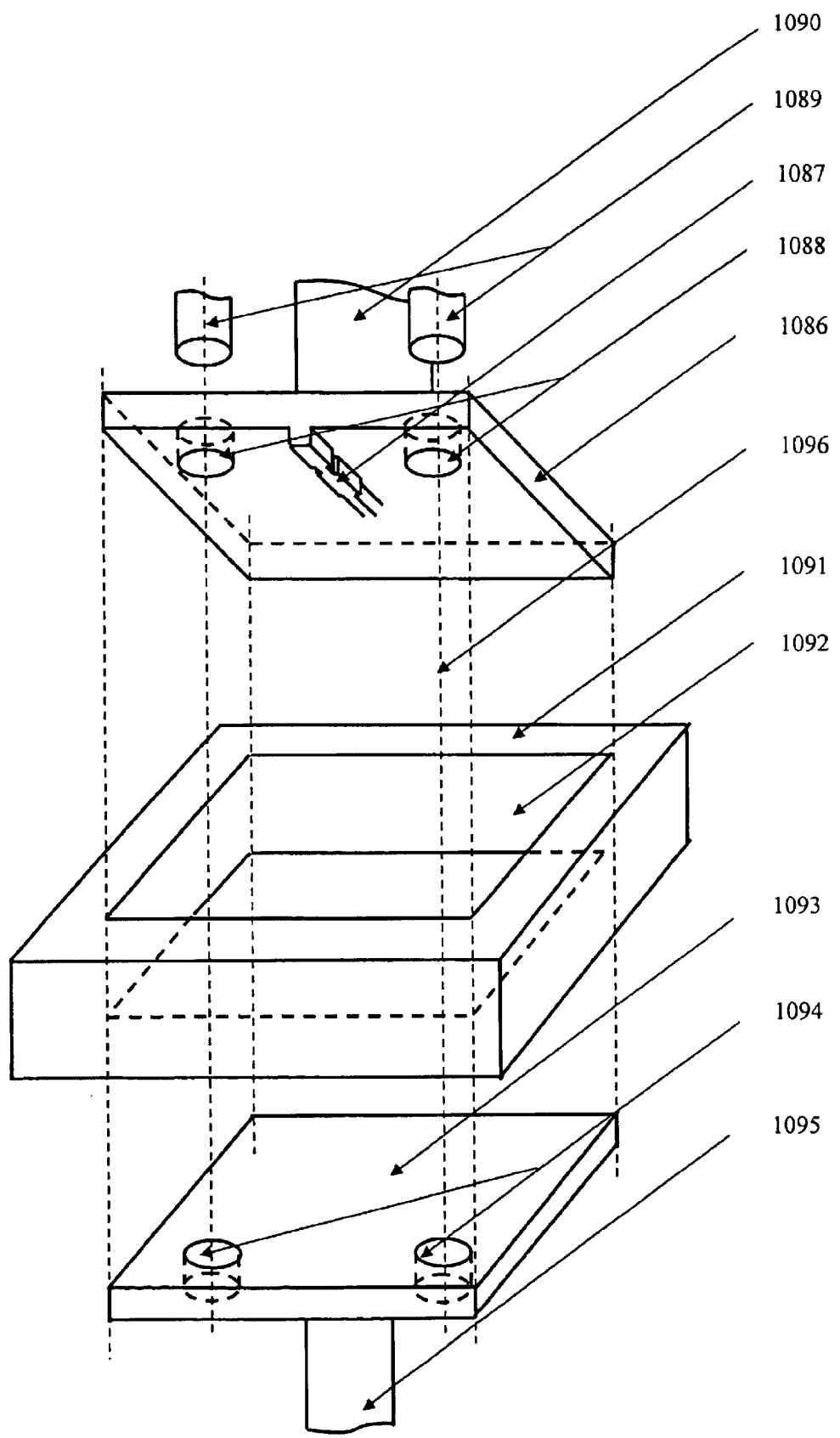
FIG. 30: A schematic drawing of a perspective exploded view of exemplary parts needs to conduct the pressing process according to the invention.

The production of a mold for pressing the ceramic powder into the substrate 1009 with the features 1008, 1010, 1011 and 1012 shown in FIGS. 4, 5 and 6 disposed into it consists of forming seven parts, which may be composed of tool steel or some other suitable material. Shaping of the tool steel can be done using precision milling, wire electro discharge machining or ram electro discharge machining or a combination of these. Precision milling can be done with tolerances of <1 micron. Five of the seven parts are shown schematically in FIG. 30, which also depicts the physical arrangement of these parts needed to conduct the pressing process and form the substrate. The five parts are:

Part 1: The top side mold 1086, which contains the features 1087 which correspond to features 1008 in FIG. 4 (only one section of these features are shown in FIG. 30 for simplicity) and the features 1088 which allow the rods 1089 to pass through the top side mold to produce the holes 1012 in FIG. 4. For simplicity, only two features 1088 are shown in FIG. 30, and the features in the top side mold needed to produce the features 1011 in FIG. 4 are not shown for simplicity. These features would appear as depressions in the top side mold 1086. The topside mold is moved up and down using the connected rod 1090.

Parts 2 and 3: The rods 1089, which are actually only two of four needed to produce the four holes 1012 in FIG. 4. Only two rods are shown in FIG. 30 for simplicity.

Part 4: The receiving mold 1091 with an open cavity 1092 disposed into it for containing the powder during the pressing process.

Part 5: The bottom side mold 1093 which contains two holes 1094 for receiving the rods 1088 which during the pressing process form the holes 1012 in FIG. 4. In FIG. 30, only 2 holes 1094 are shown for simplicity. The bottom side mold 1093 is moved up and down using the connected rod 1095.

Step 2: Pressing Process.

The process for forming the substrate consists of moving the bottom side mold 1093 up into the receiving mold 1091 and filling the receiving mold 1091 with a powder. For the production of the substrate shown in FIGS. 4, 5 and 6, Alumina powder can be used. Other powders can also be used including, for example, Aluminum Nitride or Steatite, and may include some small amount of a material known to one skilled in the art as a binder which holds the substrate together after the pressing process to prepare it for sintering or firing. Once the receiving mold was filled with powder to the desired level, the rods would pass through the top side mold 1086 and through the bottom surface of the bottom side mold 1093 through the features 1094. Then the top side mold would press the powder with a typical pressure of 5,000 to 10,000 pounds per square inch. The rods can be positioned through the bottom side mold before the powder is deposited or injected into the receiving mold.

Once the powder has been pressed into a substrate, the rods 1089 and then the top side mold 1086 are moved vertically and the bottom side mold 1093 moves the pressed substrate upward so the top of the bottom side mold 1093 is level with the top surface of the receiving mold 1091. The pressed substrate is then moved out from the mold and the process repeats. The receiving mold 1091 is fixed with a securing fixture not shown in FIG. 30. The dashed lines 1096 indicate how the five parts align during the pressing process.

Figure 31:
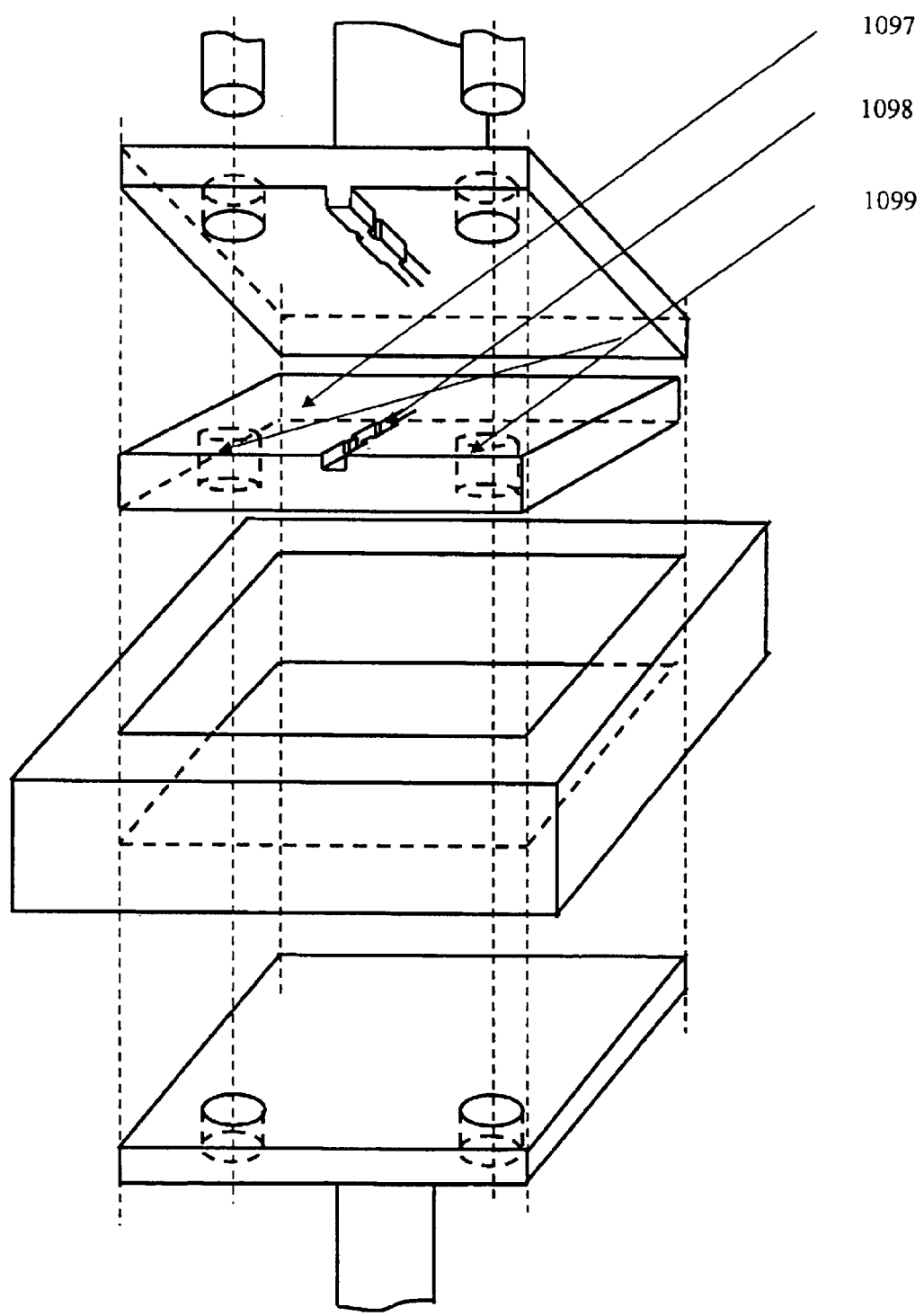
FIG. 31: A schematic drawing of the perspective exploded view shown in FIG. 31 further depicting a pressed ceramic part produced by the same mold.

FIG. 31 illustrates a pressed ceramic part 1097, produced by the mold shown in FIG. 30, with features 1098, which correspond to features 1008 in FIG. 4, and holes 1099, which correspond to the holes 1012 in FIG. 4.

Step 3: Sintering.

After the pressing step the substrate is not structurally stable. To give the substrate strength, it is then fired or sintered in an oven which causes the binder to be driven from the substrate, and causes the powders to join or fuse forming a mechanically stable material. A typical firing sequence is a ramp from room temperature to about 1000° F. over a period of roughly 8 hours to burn out any binders and/or organics in the pressed substrate. Then the temperature is increased to about 2400° F. over a period of approximately 6 hours then held at about 2400° F. to allow the ceramic material to fuse. The temperature is then decreased to room temperature from 2400° F. over a period of about 6 hours to avoid cracking. The substrate is then ready for any further processing including metallization or optical, optoelectronic or electronic component attachment.

What is claimed is:

1. A module comprising a primary substrate and a secondary substrate, wherein at least one of the primary and secondary substrates comprises pressed ceramic, and wherein the primary and secondary substrates together define a assembly for housing at least one of optical, optoelectronic and electrical components.

2. The module of claim 1 wherein at least one of the primary and secondary substrates includes a feature adapted in size and shape to receive an optical, optoelectronic or electronic component.

3. The module of claim 2 wherein the feature comprises a cylindrical cross section.

4. The module of claim 2 wherein the feature comprises a V-shaped cross section.

5. The module of claim 2 wherein the feature comprises a rectangular cross section.

6. A module as claimed in claim 1 further comprising a plurality of collimators and at least one optical component disposed in the assembly.

7. A module comprising a primary substrate and a secondary substrate, the primary and secondary substrates having complementary mating structures, wherein at least one of the primary and secondary substrates comprises pressed ceramic, and wherein the primary and secondary substrates each have one of optical, optoelectronic, and electronic components mounted thereon.

8. A module as claimed in claim 7 wherein the primary and secondary substrates each include a feature for one of aligning positioning and securing one of optical, optoelectronic and electronic components.

9. A module as claimed in claim 7 further comprising a plurality of collimators and at least one optical component mounted on the primary and secondary substrates.

10. A module as claimed in claim 9 wherein the optical component is a thin film filter.

11. A module as claimed in claim 7 wherein the module further comprises:

a pair of gratings; and a device disposed between first and second gratings, wherein the device rotates the polarization of an optical beam passing through the device, and wherein the gratings are positioned such that an optical beam reflected off the first grating passes through the device, which rotates the polarization, and then reflects off the second grating such that no part of the beam is obstructed, whereby the polarization dependence of the module is reduced and the diffraction and dispersion effects are increased.

12. A module as claimed in claim 7 wherein the secondary substrate is rotatably mounted on the primary substrate.

13. A module as claimed in claim 7 wherein the secondary substrate is pivotably mounted on the primary substrate.

14. A module as claimed in claim 7 wherein one of an optical and an optoelectronic component is rotatably mounted on the secondary substrate.

15. A module as claimed in claim 7 wherein one of an optical and an optoelectronic component is pivotably mounted on the secondary substrate.

16. A module as claimed in claim 7 wherein the primary substrate includes a cylindrical projection and wherein the secondary substrate includes a hole adapted to receive the cylindrical feature projecting from the primary substrate.

17. A module as claimed in claim 16 further comprising a filter device mounted on the secondary substrate, whereby the filter device and secondary substrate are collectively rotatable with respect to the primary substrate.

18. The device of claim 1 wherein at least one of said primary and secondary substrates comprise a ceramic made from a powder which has been processed to exhibit particle sizes in the range of about 5–250 nm.

19. A device comprising:

a primary substrate of a pressed ceramic, having an alignment feature to receive and align an optical or optoelectronic component and a secondary substrate containing an optical or optoelectronic component, wherein the feature and secondary substrate align the optical axes of at least two optical or optoelectronic components; and two optical or optoelectronic components engaged with said alignment feature such that the optical axes of the components are operatively aligned.

20. A device comprising:

a primary substrate of a pressed ceramic having an alignment feature to receive and align an optical or optoelectronic component and a secondary substrate containing an optical or optoelectronic component and a feature to receive and align said optical or optoelectronic component wherein the feature and secondary substrate align the optical axes of at least two optical or optoelectronic components; and two optical or optoelectronic components engaged with said alignment feature such that the optical axes of the components are operatively aligned.

21. The device of claim 20 wherein at least one of said primary and secondary substrate comprises a ceramic made from a powder which has been processed to exhibit particle sizes in the range of about 5–250 nm.

* * * * *